US012744876B2

(12) United States Patent
Shi et al.

(10) Patent No.: US 12,744,876 B2
(45) Date of Patent: Sep. 22, 2026

(54) CROSS-VIEW ATTENTION FOR VISUAL PERCEPTION TASKS USING MULTIPLE CAMERA INPUTS

(71) Applicant: QUALCOMM Incorporated, San Diego, CA (US)

(72) Inventors: Yunxiao Shi, San Diego, CA (US); Hong Cai, San Diego, CA (US); Fatih Murat Porikli, San Diego, CA (US); Amin Ansari, Kirkland, WA (US); Sai Madhuraj Jadhav, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 18/470,326

(22) Filed: Sep. 19, 2023

(65) Prior Publication Data

US 2024/0171727 A1 May 23, 2024

Related U.S. Application Data

(60) Provisional application No. 63/424,746, filed on Nov. 11, 2022.

(51) Int. Cl.

| | |
|---|---|
| ***G06T 7/50*** | (2017.01) |
| ***G06V 10/44*** | (2022.01) |
| ***G06V 10/771*** | (2022.01) |
| ***G06V 10/82*** | (2022.01) |
| ***G06V 20/56*** | (2022.01) |
| ***H04N 13/351*** | (2018.01) |
| ***H04N 13/363*** | (2018.01) |

(52) U.S. Cl.
CPC ............ *H04N 13/363* (2018.05); *G06T 7/50* (2017.01); *G06V 10/44* (2022.01); *G06V 10/771* (2022.01); *H04N 13/351* (2018.05); *G06V 2201/07* (2022.01)

(58) Field of Classification Search
CPC .................................. G06T 7/50; G06T 7/55
See application file for complete search history.

(56) References Cited

PUBLICATIONS

Wang, Sinong, et al. "Linformer: Self-attention with linear complexity." arXiv preprint, cited in IDS. (Year: 2020).*
Guizilini V. et al. "DETR3D: 3D Object Detection from Multi-view Images via 3D-to-2D Queries" arXiv preprint (Year: 2021).*
(Continued)

*Primary Examiner* — Oneal R Mistry
*Assistant Examiner* — Nhut Huy Pham
(74) *Attorney, Agent, or Firm* — QUALCOMM Incorporated

(57) ABSTRACT

Systems and techniques are provided for processing image data. For example, a process can include obtaining a plurality of input images associated with a plurality of different spatial views. The process can include generating a set of features based on the plurality of input images. The process can include generating a set of projected features based on the set of features, wherein an embedding size associated with the set of projected features is smaller than an embedding size associated with the set of features. The process can include determining a cross-view attention associated with the plurality of different spatial views, the cross-view attention determined using the set of projected features.

26 Claims, 9 Drawing Sheets

(56) References Cited

PUBLICATIONS

Wei, Yi, et al. "SurroundDepth: Entangling Surrounding Views for Self-Supervised Multi-Camera Depth Estimation." arXiv e-prints, cited in IDS, published Sep. 20, 2022. (Year: 2022).*

Wei, Yi, et al. "SurroundDepth: Entangling Surrounding Views for Self-Supervised Multi-Camera Depth Estimation." arXiv e-prints (Year: 2022).*

Fu, Jun, et al. "Dual attention network for scene segmentation." Proceedings of the IEEE/CVF conference on computer vision and pattern recognition (Year: 2019).*

International Search Report and Written Opinion—PCT/US2023/074648—ISA/EPO—Dec. 4, 2023.

Shi Y., et al., "EGA-Depth: Efficient Guided Attention for Self-Supervised Multi-Camera Depth Estimation", arxiv.org, Cornell University Library, 201 Olin Library Cornell University Ithaca, NY 14853, Apr. 6, 2023, XP091478767, 11 Pages, The Whole Document.

Wang S., et al., "Linformer: Self-Attention with Linear Complexity", arxiv.org, Jun. 14, 2020, XP081693452, pp. 1-12, The Whole Document.

Wei Y., et al., "SurroundDepth: Entangling Surrounding Views for Self-Supervised Multi-Camera Depth Estimation", arxiv.org, Cornell University Library, 201 Olin Library Cornell University Ithaca, NY 14853, Apr. 7, 2022, XP091201380, pp. 1-18, Abstract, Section 3.2, 3.3, 4.2, Figures 2, 3.

Zhao Y., et al., "Lightweight Vision Transformer with Cross Feature Attention", arxiv.org, Cornell University Library, 201 Olin Library Cornell University Ithaca, NY 14853, Jul. 15, 2022, XP091271958, pp. 1-11, Section 3, Figure 1.

* cited by examiner

CROSS-VIEW ATTENTION FOR VISUAL PERCEPTION TASKS USING MULTIPLE CAMERA INPUTS

CROSS-REFERENCE TO RELATED APPLICATIONS

This application claims priority to U.S. Provisional Patent Application No. 63/424,746, filed Nov. 11, 2022, which is hereby incorporated by reference, in its entirety and for all purposes.

FIELD

The present disclosure generally relates to image processing. For example, aspects of the present disclosure are related to systems and techniques for performing one or more visual perception tasks using a machine learning system including one or more transformer layers.

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

An artificial neural network attempts to replicate, using computer technology, logical reasoning performed by the biological neural networks that constitute animal brains. Deep neural networks, such as convolutional neural networks, are widely used for numerous applications, such as object detection, object classification, object tracking, big data analysis, among others. For example, convolutional neural networks are able to extract high-level features, such as facial shapes, from an input image, and use these high-level features to output a probability that, for example, an input image includes a particular object.

BRIEF SUMMARY

In some examples, systems and techniques are described for performing machine learning-based cross-view attention with a linear computational complexity. For example, the systems and techniques can be used to perform one or more visual perception tasks based on spatially distributed views, with a computational complexity that is linear with an input image resolution. According to at least one illustrative example, a method is provided for processing image data. The method includes: obtaining a plurality of input images associated with a plurality of different spatial views; generating a set of features based on the plurality of input images; generating a set of projected features based on the set of features, wherein an embedding size associated with the set of projected features is smaller than an embedding size associated with the set of features; and determining a cross-view attention associated with the plurality of different spatial views, the cross-view attention determined using the set of projected features.

In another illustrative example, an apparatus is provided for processing image data. The apparatus includes at least one memory and at least one processor coupled to the at least one memory and configured to: obtain a plurality of input images associated with a plurality of different spatial views; generate a set of features based on the plurality of input images; generate a set of projected features based on the set of features, wherein an embedding size associated with the set of projected features is smaller than an embedding size associated with the set of features; and determine a cross-view attention associated with the plurality of different spatial views, the cross-view attention determined using the set of projected features.

In another illustrative example, a non-transitory computer-readable storage medium comprising instructions stored thereon which, when executed by at least one processor, causes the at least one processor to: obtain a plurality of input images associated with a plurality of different spatial views; generate a set of features based on the plurality of input images; generate a set of projected features based on the set of features, wherein an embedding size associated with the set of projected features is smaller than an embedding size associated with the set of features; and determine a cross-view attention associated with the plurality of different spatial views, the cross-view attention determined using the set of projected features.

In another illustrative example, an apparatus is provided for processing image data. The apparatus includes: means for obtaining a plurality of input images associated with a plurality of different spatial views; means for generating a set of features based on the plurality of input images; means for generating a set of projected features based on the set of features, wherein an embedding size associated with the set of projected features is smaller than an embedding size associated with the set of features; and means for determining a cross-view attention associated with the plurality of different spatial views, the cross-view attention determined using the set of projected features.

In some aspects, one or more of the apparatuses described herein is, is part of, and/or includes an extended reality (XR) device or system (e.g., a virtual reality (VR) device, an augmented reality (AR) device, or a mixed reality (MR) device), a mobile device (e.g., a mobile telephone or other mobile device), a wearable device, a wireless communication device, a camera, a personal computer, a laptop computer, a vehicle or a computing device or component of a vehicle, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following drawing figures.

DETAILED DESCRIPTION

Figure 1:
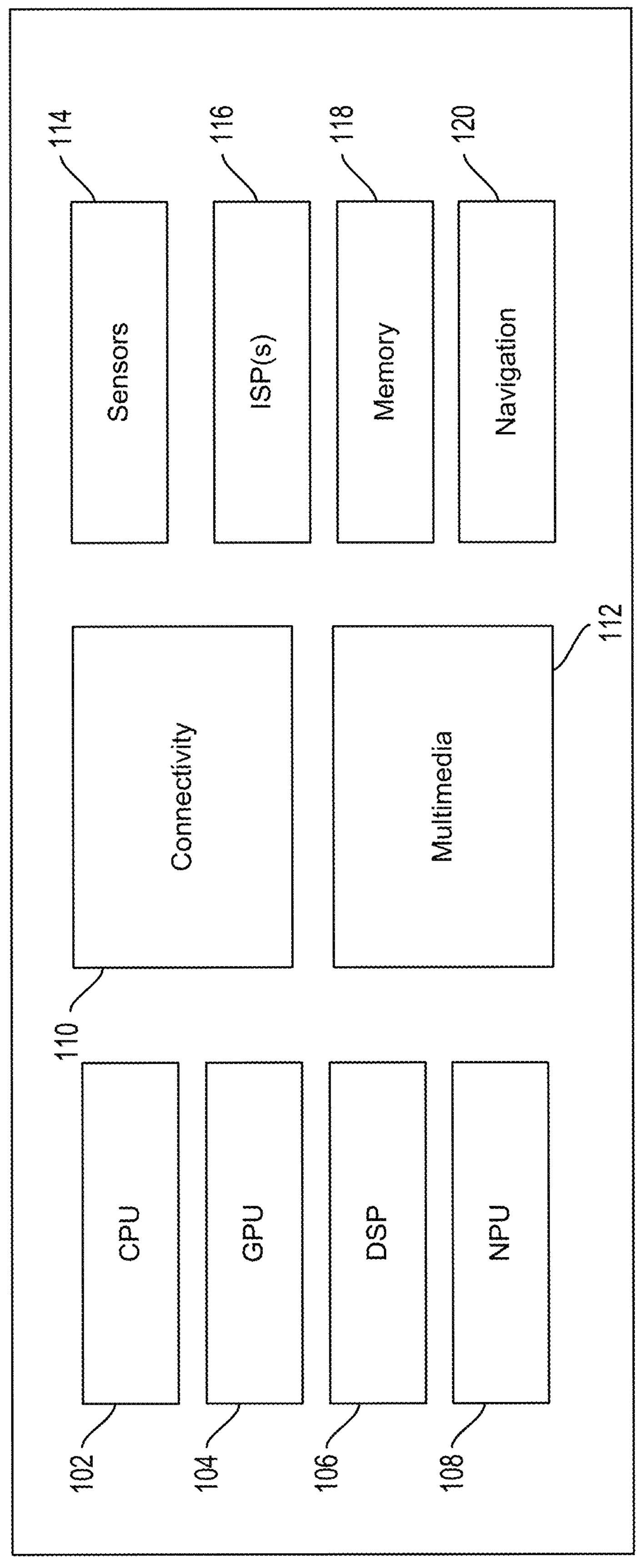
FIG. 1 illustrates an example implementation of a system-on-a-chip (SoC), in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of the subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

Machine learning networks can be used to perform various visual perception tasks (e.g., also referred to as "visual recognition tasks"). For example, a machine learning network can be used to perform visual perception tasks that include depth estimation and/or depth map generation, image segmentation and/or semantic segmentation, object detection and/or classification, optical flow estimation and/or optical flow map generation, among others. In some cases, a machine learning network can be trained to perform one or more visual perception tasks based on input(s) that include image data of a scene. Image data of a scene can include still images captured by a camera. Image data may also include a series of still images (e.g., video frames) captured by a camera.

In some examples, a machine learning network can be trained to perform one or more visual perception tasks using image data captured by a single camera. In some aspects, image data captured by a single camera may be associated with a fixed or static spatial viewpoint (e.g., if the single camera remains stationary relative to the scene being captured in the image data). In some examples, a machine learning network can be trained to perform the one or more visual perception tasks using spatially distributed image data captured by one or more cameras (e.g., multiple spatial viewpoints may be represented in the input image data).

For example, a single camera that is moving relative to the scene being captured in the image data may capture spatially distributed image data (e.g., different spatial viewpoints are represented in the image data captured at different times). In some examples, multiple cameras can be used to capture spatially distributed image data. Some (or all) of the multiple cameras used to captured spatially distributed image data may be associated with a fixed or static spatial viewpoint. In some examples, some (or all) of the multiple cameras used to capture spatially distributed image data may be moving through or moving relative to the scene being captured in the spatially distributed image data.

In some aspects, spatially distributed image data can be obtained from multiple cameras that are included on a vehicle (e.g., an autonomous vehicle, semi-autonomous vehicle, etc.) or otherwise associated with a vehicle. For example, spatially distributed image data can be obtained from multiple cameras that are included in a driver assistance system (DAS) and/or an advanced driver assistance system (ADAS). In some examples, spatially distributed image data can be obtained from multiple cameras that are included on an extended reality (XR) or augmented reality (AR) device or headset, from multiple cameras that are included on a smartphone or mobile computing device, from multiple cameras that are included on an Internet-of-Things (IoT) device, etc.

In some cases, machine learning-based visual perception tasks that utilize spatially distributed input image data as input may be associated with improved performance in the visual perception task. For example, when spatially distributed input image data is utilized, some portions of the scene being analyzed may be observed multiple times. These multiple observations may be multiple spatial observations (e.g., a portion of the scene is observed from multiple different spatial viewpoints/cameras at a given time) and/or may be multiple temporal observations (e.g., a portion of the scene is observed from a given spatial viewpoint at multiple different times). In some examples, the multiple observations may include multiple spatial-temporal observations, wherein a portion of the scene is observed from multiple different viewpoints across multiple different times.

In one illustrative example, the multiple observations (e.g., also referred to as "multiple views") associated with spatially distributed input image data can be fused to improve an accuracy of the visual perception task performed using a machine learning network. For example, when the visual perception task is a depth perception task (e.g., such as depth estimation, depth map generation, etc.), depth estimates can be determined for the individual views and fused to obtain a depth estimate over the multiple views. In some examples, multiple views can be used to perform visual perception tasks that cannot be performed using only a single view. For example, a depth estimation based on parallax can be performed using the multiple views included in spatially distributed input image data but may be difficult or impossible to perform using a single view input image data.

In some aspects, visual perception tasks (e.g., such as depth estimation, segmentation, object detection, optical flow, etc.) can be performed using a machine learning network that includes one or more transformer layers. A transformer is a type of deep learning model that utilizes an attention mechanism to differentially weight the significance of each part of the input data and model long-range dependencies. For example, transformers can use an attention mechanism to determine global dependencies between input and output sequences. While transformers are often used to handle sequential input data, a transformer does not necessarily process the data in the same sequential order in which the data was originally received or arranged. Moreover, because transformers can use attention to determine contextual relationships between sub-portions of the input data, a transformer can process some or all of the sub-portions in parallel, such as when computing attention, self-attention, and/or cross-attention. This parallelization can provide greater computational flexibility in comparison to, for example, recurrent neural networks (RNNs), CNNs, or other neural networks trained to perform the same task.

Transformer-based machine learning networks can be used to perform visual perception tasks based on input image data that includes a single view (e.g., a static and/or non-spatially distributed input image data). Transformer-based machine learning networks can also be used to perform visual perception tasks based on input image data that includes multiple views (e.g., multi-camera and/or spatially distributed input image data). In some cases, to perform a visual perception task based on spatially distributed input image data, existing transformer-based machine learning networks apply self-attention to jointly process information across all of the multiple views. For large and/or long input sequences, the existing self-attention mechanism of transformer-based machine learning networks uses $O(n^2)$ time and space with respect to sequence length.

For example, the self-attention can be determined by generating a plurality of tokens for a given set of input features generated for an input sequence (e.g., an image or set of images). As the plurality of tokens are passed through a series of transformer layers, at each layer, each token's representation is updated by attending to all other tokens in the previous layer. Attending to all n tokens in the previous layer for all n tokens in the current layer incurs a complexity of $O(n^2)$ with respect to sequence length.

Based on the $O(n^2)$ complexity of existing self-attention mechanisms, the computational complexity (e.g., and therefore, computational time and/or resources needed) to perform visual perception tasks using a transformer-based machine learning network may grow exponentially with the input resolution of the input image data. Based on the exponential complexity of determining self-attention, the resolution over which self-attention can be determined when performing visual perception tasks may be limited. Based on a lowered input image resolution, the output or results of the visual perception task may be decreased. There is a need for systems and techniques that can be used to perform visual perception tasks with less than exponential complexity with input image resolution. There is a further need for systems and techniques that can be used to perform visual perception tasks for spatially distributed input image data having higher input image resolutions.

Systems, apparatuses, processes (also referred to as methods), and computer-readable media (collectively referred to as "systems and techniques") are described herein for performing one or more visual perception tasks based on machine learning-based cross-view attention. The machine learning-based cross-view attention can be a self-attention determined using one or more transformer-based layers included in a machine learning network. In some examples, the machine learning-based cross-view attention can be a cross-attention determined using one or more transformer-based layers included in a machine learning network. In some cases, "self-attention" and "cross-attention" may be used interchangeably herein. For example, self-attention can be determined using one or more transformer-based layers that receive a query (Q), key (K), and value (V) input that are obtained from the same embedding sequence (e.g., obtained from the same set of features). Cross-attention can be determined using one or more transformer-based layers that receive a query input from a first embedding sequence and receive key and value inputs from a second embedding sequence that is different than the first embedding sequence. Cross-attention and self-attention can be determined using the same transformer-based machine learning architecture.

In one illustrative example, the systems and techniques can be used to perform one or more visual perception tasks based on a series of camera inputs that overlap at least partially in space and/or in time. For example, the systems and techniques can receive as input a spatially distributed input image data that includes multiple views and/or multiple spatial viewpoints. The multiple views and/or multiple spatial viewpoints can be captured using one or more cameras. Multiple views can be captured at a given time and/or multiple views can be captured over time using one or more moving cameras (e.g., one or more cameras that move through space relative to the scene being captured).

In some aspects, the systems and techniques can perform the one or more visual perception tasks based on machine learning-based cross-view attention having a computational complexity that is linear with an input image resolution. In some examples, the machine learning-based cross-view attention can be implemented using one or more transformer layers and/or transformer-based neural networks. In one illustrative example, the one or more transformer-based layers can be linformer layers. In some aspects, the systems and techniques can utilize fixed embedding sizes to improve an efficiency and/or memory consumption associated with the cross-view attention determination. For example, input multi-scale feature maps can be used to generate fixed embedding size feature maps. The fixed embedding size feature maps can be used to determine cross-view attention associated with the multiple views and/or multiple camera spatial viewpoints included in a spatially distributed input image data. In one illustrative example, the fixed embedding size feature maps may be twice as large and contain four times as many entries as a feature map provided to a standard self-attention mechanism (e.g., twice as large in length and twice as large in height, for a four-times increase in entries; etc.). In some aspects, a computational cost and/or computational complexity associated with the cross-view attention using fixed embedding size feature maps can be approximately linear with the input image resolution.

Various aspects of the present disclosure will be described with respect to the figures.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform image processing using machine learning techniques according to aspects of the present disclosure discussed herein. For example, SOC 100 and/or components thereof may be configured to perform semantic image segmentation according to aspects of the present disclosure. In some cases, by using neural network architectures such as transformers and/or shifted window transformers in determining one or more segmentation masks, aspects of the present disclosure can increase the accuracy and efficiency of semantic image segmentation.

In general, ML can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multilayer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
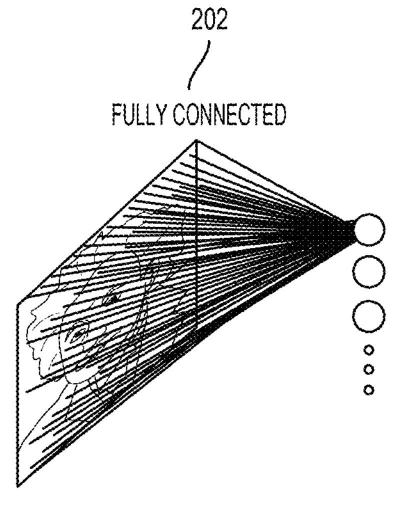
FIG. 2A illustrates an example of a fully connected neural network, in accordance with some examples.
Figure 2B:
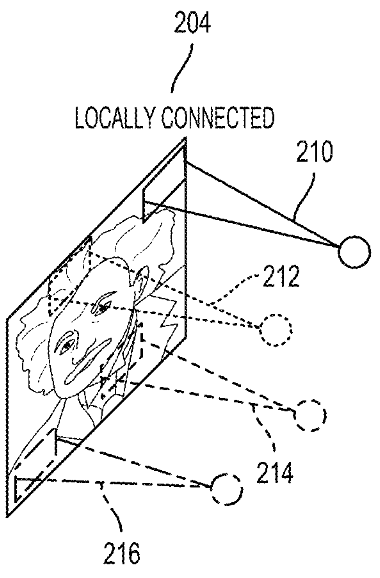
FIG. 2B illustrates an example of a locally connected neural network, in accordance with some examples.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, as the higher layer neurons in a given region may receive inputs that are tuned through training to the properties of a restricted portion of the total input to the network.

As mentioned previously, systems and techniques are described herein for performing machine learning-based cross-view attention for one or more visual perception tasks based on spatially distributed views. For example, the systems and techniques can be used to perform one or more visual perception tasks based on a series of camera inputs that overlap at least partially in space and/or in time. In some aspects, the systems and techniques can perform the one or more visual perception tasks based on machine learning-based cross-view attention having a computational complexity that is linear with an input image resolution. In some examples, the machine learning-based cross-view attention can be implemented using one or more transformer layers and/or transformer-based neural networks.

A transformer is a type of deep learning model that utilizes an attention mechanism to differentially weight the significance of each part of the input data and model long-range dependencies. For example, transformers can use the attention mechanism to determine global dependencies between input and output sequences. A transformer may utilize an encoder-decoder architecture. The encoder can include a plurality of encoder layers to process an input sequence iteratively, one layer after another. The decoder can include a plurality of decoder layers to process the encoder output sequence iteratively, one layer after another (e.g., the encoder output is provided as an input to the decoder). Each encoder and decoder layer can include an attention mechanism. For each portion of an input, attention can be used to weight the relevance of every other portion of the input and generate a corresponding output. Decoder layers can include an additional attention mechanism that utilizes information from decoder output(s) at previous time steps. For example, a decoder layer can include an attention mechanism for processing information from decoder outputs at previous time steps, prior to an attention mechanism included in the decoder for processing information from the encodings (e.g., generated by the encoder layer(s)) associated with the current time step.

A transformer can include a feed-forward neural network component in both the encoder and the decoder layers. For example, a feed-forward neural network component can be provided between the attention mechanism included in the encoder layers and the output of the encoder layers, and a feed-forward neural network component can be provided between the attention mechanism included in the decoder layers and the output of the decoder layers. In some examples, the feed-forward neural network may be implemented as a multi-layer perceptron (MLP), among other types of feed-forward neural networks.

In some examples, a transformer can determine attention weights between all tokens simultaneously (e.g., wherein the tokens correspond to features or embeddings, etc.). For example, an attention layer can generate an embedding for each respective token such that the embedding includes (or is otherwise indicative of) information associated with the respective token and a weighted combination of other relevant tokens associated with the respective token. The other relevant tokens associated with the respective token may each be weighted by a corresponding attention weight (e.g., wherein the attention weight is indicative of the weight or strength of the association between the relevant token and the respective token).

An attention layer can be trained to learn three attention weighting matrices, given as a query weights matrix $W_Q$, a key weights matrix $W_K$, and a value weights matrix $W_V$. For each given token i, the corresponding token embedding $x_i$ is multiplied by the three attention weighting matrices to produce a query vector $q_i=x_iW_Q$, a key vector $k_i=x_iW_K$, and a value vector $v_i=x_iW_V$. Attention weights can be determined based on the query vector $q_i$ and the key vector $k_i$. For example, the attention weight $a_{ij}$ u from token i to token j can be determined as the dot product between $q_i$ and $k_j$.

Based on the query weights matrix, $W_Q$, and the key weights matrix, $W_K$, being provided as two separate matrices, attention can be non-symmetric. For example, the attention weight $a_{ij}$ can be determined as the dot product $q_i \cdot k_j$ and represents the attention from token i to token j. When attention is non-symmetric, the attention weight $a_{ij}$ can be different than the attention weight $a_{ji}$ (e.g., the attention weight from token j to token i), which can be determined as the dot product $q_j \cdot k_i$.

The output of a transformer attention layer for a given token i is the weighted sum of the value vectors (e.g., $v_i$) of all tokens, weighted by $a_{ij}$, the attention from token i to each of the j additional tokens. For example, an attention layer can determine attention values by computing a matrix of outputs as:

$$\text{Attention }(Q, K, V) = softmax\left(\frac{QK^T}{\sqrt{d_k}}\right)V$$

Here, the matrix Q is the matrix including all of the i query vectors $q_i$ as row entries; the matrix K is the matrix including all of the i key vectors $k_i$ as row entries; and the matrix V is the matrix including all of the i value vectors $v_i$ as row entries. For example, $Q=W_q \cdot X$; $K=W_k \cdot X$; and $V=W_v \cdot X$. In some aspects, when the inputs to Q, K, V are the same X, the attention computation is a "self" attention. When the inputs to Q, K, V are not the same X, the attention computation is a "cross" attention. For example, self-attention can be determined by using the same embedding sequence X as input to Q, K, and V. Cross-attention can be determined by using a first embedding sequence $X_1$ as input to Q and a second embedding sequence $X_2$ as input to K and V.

The $W_q$, $W_k$, and $W_v$ terms are linear layers that project or map the input vector X to the query (Q), key (K), and value (V) matrices. The term $d_k$ refers to a dimension of a key k, with $\sqrt{d_k}$ acting as a scaling factor. Softmax refers to a softmax function that is used obtain weights on the self-attention values. The layer norm can output the weights to the feedforward neural network component described previously above, as being provided prior to or at the output of the transformer encoder layers and the output of the transformer decoder layers.

Figure 3:
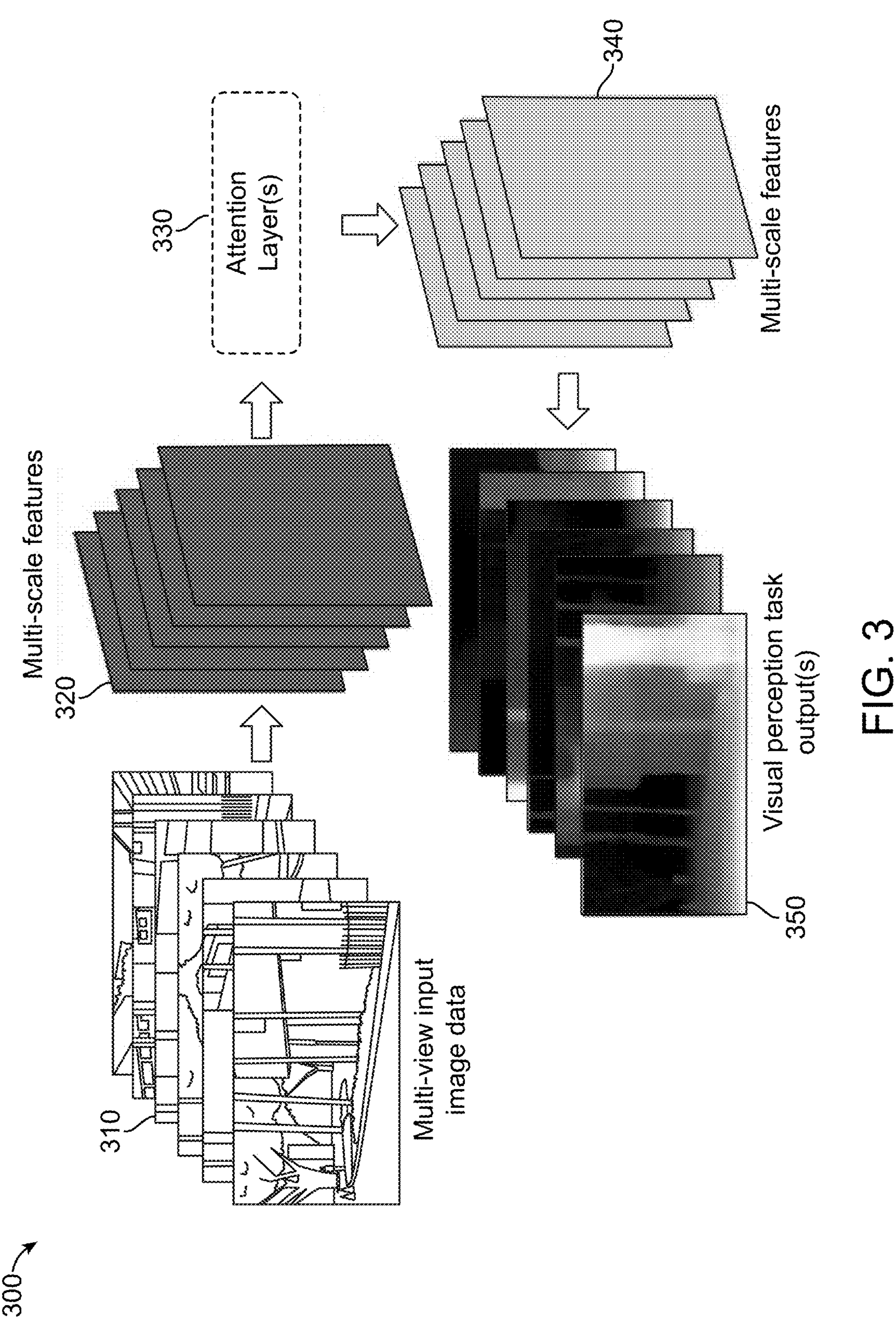
FIG. 3 is a diagram illustrating an example of an attention-based machine learning architecture that can be used to generate one or more visual perception task outputs based on an input image data that includes multiple views, in accordance with some examples.

FIG. 3 is a diagram illustrating an example of an attention-based machine learning architecture 300 that can be used to generate one or more visual perception task outputs 350 based on an input image data 310 that includes multiple views. For example, the input image data 310 can be a spatially distributed input image data that includes multiple views (e.g., multiple images) captured using multiple cameras each associated with a respective spatial viewpoint. In some cases, the input image data 310 can include a plurality of images captured using spatially distributed views (e.g., multiple views) captured using one or more cameras over time. For example, the input image data 310 can include N images captured using N cameras (e.g., one image and/or view per camera). In one illustrative example, the input image data 310 can be obtained using multiple cameras that capture multiple views with at least a partial view overlap between two or more cameras included in the multiple cameras. In another illustrative example, the input image data 310 can be obtained using one or more cameras that capture video data and/or other sequences of images or frames over time, wherein the video data and/or image sequences have at least a partial overlap.

For example, the multi-view (e.g., spatially distributed input image data 310) can be obtained using multiple cameras mounted on or otherwise included in a car or other vehicle, multiple cameras mounted on or otherwise included in an XR or AR headset and/or system, multiple cameras mounted on or otherwise included in a smartphone or other mobile computing device, multiple cameras included in an IoT camera network, multiple cameras included on one or more drones and/or a network of drones, etc.

The example attention-based machine learning architecture 300 can generate a plurality of multi-scale features 320 corresponding to the multi-view input image data 310. For example, the multi-scale features 320 can be generated by providing the multi-view input image data 310 to one or more encoders (e.g., machine learning encoder networks, etc.). In some aspects, the multi-scale features 320 can be generated by providing the multi-view input image data 310 to one or more neural networks, including CNNs, RNNs, etc. For example, the multi-scale features 320 can be feature or embeddings generated as output by an image classification neural network, etc. In some examples, each image of a plurality of images included in the multi-view input image data 310 can be processed using a corresponding encoder network, which can generate a corresponding multi-scale visual feature map for the particular image. For instance, N cameras can be used to capture N images (e.g., N images included in the multi-view input image data), which are processed using n encoder networks (n≤N) to generate N multi-scale visual feature maps included in the plurality of multi-scale features 320.

The multi-scale features 320 can be provided as input to one or more attention layers 330. In one illustrative example, the one or more attention layers 330 can be included in one or more transformer-based machine learning networks and/or can be included in one or more transformer layers of a machine learning network. For example, the attention layers 330 can determine self-attention and/or cross-attention between the multi-scale features 320, as described previously above. For example, the multi-scale features 320 can include a separate set of features for each camera or spatial viewpoint included in the multi-scale features 320. In some cases, the multi-scale features 320 can include a single set of features that is a concatenation of the features generated for each camera or spatial viewpoint included in the multi-scale features 320.

Based on the attention calculation implemented using the attention layers 330, a plurality of multi-scale attention features 340 can be generated as output. For example, the multi-scale attention features 340 can correspond to or be indicative of an output of a given visual perception task (e.g., depth estimation, image segmentation, object detection, optical flow, etc.) performed using the example attention-based machine learning architecture 300. In some cases, the multi-scale attention features 340 can be used to generate or otherwise determine one or more visual perception task outputs 350 (e.g., illustrated in FIG. 3 as depth estimation or depth map outputs, corresponding to an example in which the attention-based machine learning architecture 300 is used to perform a depth estimation visual perception task).

Figure 4:
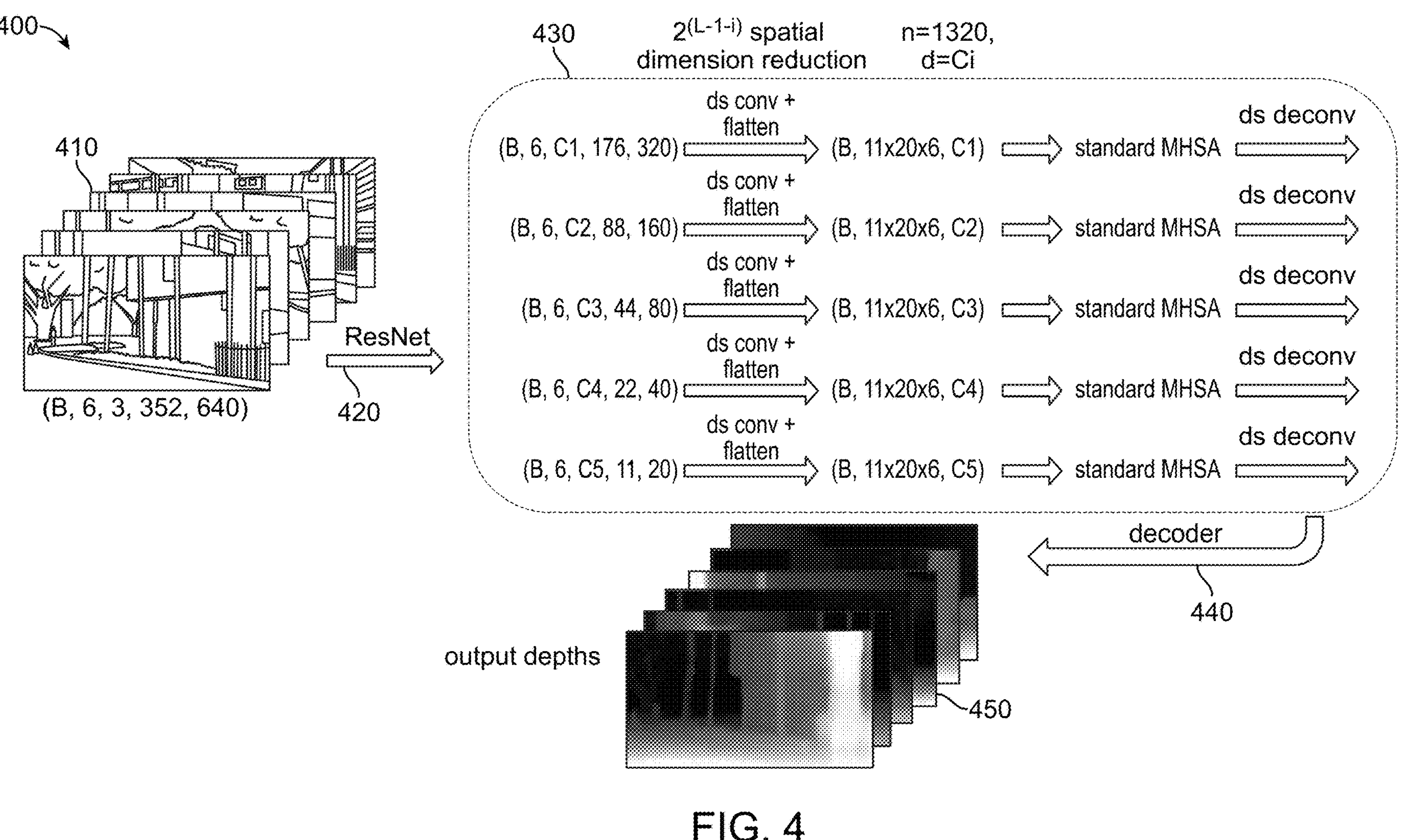
FIG. 4 is a diagram illustrating an example transformer-based machine learning network that can be used to determine attention using a plurality of multi-headed self-attention (MHSA) layers that are associated with exponential computational complexity O(n2) with respect to input sequence length, in accordance with some examples.

As mentioned previously, computing self-attention for the multi-view input image data 310 can be associated with exponential computational complexity that incurs a complexity of $O(n^2)$ with respect to sequence length (e.g., the sequence length of the multi-scale features 320 provided as input to attention layers 330). FIG. 4 is a diagram illustrating an example transformer-based machine learning network 400 that determines attention using a plurality of multi-headed self-attention (MHSA) layers 430 that are associated with exponential computational complexity $O(n^2)$ with respect to input sequence length. In some aspects, the plurality of MHSA layers 430 can receive as input a multi-view (e.g., spatially distributed) input image data 410, which can be the same as or similar to the multi-view input image data 310 illustrated in FIG. 3. In some examples, the plurality of MHSA layers 430 can be the same as or similar to the one or more attention layers 330 illustrated in FIG. 3. A visual perception task output 450 can be the same as or similar to the visual perception task output 350 illustrated in FIG. 3.

The multi-view input image data 410 can be RGB image data or image data captured in various other color spaces. As illustrated, the multi-view input image data 410 can be RGB image data captured by six different cameras (e.g., or otherwise including six different views). The multi-view input image data 410 can include three channels (e.g., a red (R) channel, a blue (B) channel, and a green (G) channel), each having dimensions of 352×640. In some examples, the dimension parameters of the multi-view input image data 410 can be given in pixels (e.g., 352 pixels in height and 640 pixels in width, or vice versa). For example, as depicted in FIG. 4, the multi-view input image data 410 is indicated as (B, 6, 3, 352, 640) multi-view input image data. Here, the parameter B can indicate a batch size. For example, the multi-view input image data 410 can be associated with a batch size of B=1, indicating that each iteration of the example transformer-based machine learning network 400 utilizes a set of input data that includes six images (e.g., the same as the multi-view input image data 410). In other example, a batch size of B=2 can indicate that each iteration of the example transformer-based machine learning network 400 can utilize two batches of input data each including six images (e.g., two sets of input images the same as the multi-view input image data 410), etc.

The multi-view input image data 410 can include an input image associated with each view of the multiple views for each time step. For example, when multi-view input image data 410 is associated with or includes six different cameras/views, the multi-view input image data 410 can include six different images at each time step. For each time step, the multi-view input image data 410 can be provided as input to an image encoder 420, which generates as output a corresponding set of features or embeddings associated with the multi-view input image data 410. For example, in some cases, the image encoder 420 can be a CNN implementing a ResNet architecture. In one illustrative example, the image encoder 420 can implement the ResNet34 architecture.

The plurality of MHSA layers 430 can include a plurality of different scales. For example, as illustrated, the plurality of MHSA layers 430 can include five different scales. A first scale is depicted as the top row of the plurality of MHSA layers 430, having dimensions (B, 6, C1, 176, 320). In some aspects, the parameter B can represent a batch size, and may be the same as the batch size associated with the multi-view input image data 310. In one illustrative example, the first scale can receive as input the image features (e.g., generated from the multi-view input image data 410 using image encoder 420) associated with the six different views and having C1 different channels, each having a dimension of 176×320. In some aspects, C1 can be greater than or equal to three (e.g., based on the image features generated by image encoder 420 having a greater dimensionality or channel quantity than the three RGB channels included in the multi-view input image data 410. In some examples, the first scale can have channels with dimensions that are half the size of the multi-view input image data 410 dimensions.

A second scale included in the plurality of MHSA layers 430 has dimensions (B, 6, C2, 88, 160). For example, the second scale can receive as input a set of features associated with the same six views and having C2 different channels, each having a dimension of 88×160.

In some aspects, the quantity of channels C2 included in the second scale of MHSA layers 430 can be greater than the quantity of channels C1 included in the first scale of MHSA layers 430. In some cases, the input to the second scale can be the same as or based on the output of the first scale. In some examples, the input to the second scale can be generated based on or obtained from the set of image features generated by the image encoder 420. In some examples, the second scale can have channels with dimensions that are half the size of the channels included in the first scale (e.g., 88×160 and 176×320, respectively).

A third scale included in the plurality of MHSA layers 430 has dimensions (B, 6, C3, 44, 80). The third scale can receive as input a set of features associated with the same six views and having C3 different channels, each having a dimension of 44×80. In some examples, C3>C2>C1>3. As illustrated, the third scale can have channels with dimensions that are half the size of the channels included in the second scale (e.g., 44×80 and 88×160, respectively).

A fourth scale included in the plurality of MHSA layers 430 has dimensions (B, 6, C4, 22, 40). The fourth scale can receive as input a set of features associated with the same six views and having C4 different channels, each having a dimension of 22×40. In some examples, C4>C3>C2>C1>3. As illustrated, the fourth scale can have channels with dimensions that are half the size of the channels included in the third scale (e.g., 22×40 and 44×80, respectively).

A fifth scale included in the plurality of MHSA layers 430 has dimensions (B, 6, C5, 11, 20). The fifth scale can receive as input a set of features associated with the same six views and having C5 different channels, each having a dimension of 11×20. In some examples, C5>C4>C3>C2>C1>3. As illustrated, the fifth scale can have channels with dimensions that are half the size of the channels included in the fourth scale (e.g., 11×20 and 22×40, respectively).

In some examples, the respective scales included in the plurality of MHSA layers 430 (e.g., the first through fifth scales) can be associated with a $2^{(L-1-i)}$ reduction in spatial dimensions, where L represents the total quantity of scales (e.g., L=5 in the example of FIG. 4) and i represents the i-th scale included in the plurality of MHSA layers 430. For example, as described above, the spatial dimensions of the channels included in consecutive scales can be reduced by a factor of ½ (e.g., $2^{-1}$).

In some examples, a greater or lesser quantity of scales can be included in or implemented by the plurality of MHSA layers 430. For example, a greater or lesser reduction in spatial dimensions of the channels can be applied (e.g., greater or lesser than ½) between consecutive scales. In some aspects, the spatial dimensions of the final scale included in the plurality of MHSA layers 430 can be equal to the spatial dimensions of the features provided as input to the MHSA included in each respective scale. For example, as illustrated in FIG. 4, the spatial dimensions of the fifth scale can be 11×20, which is the same as the 11×20 spatial dimension utilized as input to the MHSA included in each of the five scales.

In some aspects, each of the different scales (e.g., the five different scales illustrated in FIG. 4) included in the plurality of MHSA layers 430 can include one or more convolution and flattening layers. For example, the convolution layer(s) can be provided as depth-wise separable (DS) convolution layer(s). The input features to each scale can be provided as input to the one or more convolution and flattening layers, which generate as output a corresponding set of spatially reduced features having the same quantity of channels. For example, the one or more convolution and flattening layers included in the first scale can receive as input features with dimensions (B, 6, C1, 176, 320) and generate as output a set of spatially reduced features with dimensions (B, 11×20×6, C1), the one or more convolution and flattening layers included in the second scale can receive as input features with dimensions (B, 6, C2, 88, 160) and generate as output a set of spatially reduced features (B, 11×20×6, C2), etc.

As illustrated in FIG. 4, the set of spatially reduced features provided as input to the MHSA included in each scale can be characterized by n=1320 and d=Ci (e.g., each set of spatially reduced features includes 11*20*6 =1320 features, having a quantity of dimensions/channels equal to Ci).

The MHSA included in each scale can calculate a multi-headed self-attention across the 1,320 features, with a computational complexity of $O(n^2)$ relative to the input resolution of the multi-view input image data 410. The output of the MHSA included in each scale (e.g., the self-attention) can be provided to one or more deconvolution layers. For example, the one or more deconvolution layers can be provided as depth-wise sparable (DS) deconvolution layers.

A decoder 440 can receive as input the attention (e.g., self-attention) determined using the scales included in the plurality of MHSA layers 430. Based on this attention (e.g., self-attention) information calculated for the multi-view input image data 410, decoder 440 can generate one or more visual perception task outputs 450. For example, when the visual perception task is a depth estimation visual perception task, decoder 440 can generate one or more depth maps or other depth estimations as the visual perception task outputs 450. In some aspects, the plurality of MHSA layers 430 can be included in one or more transformer-based encoder layers of the example transformer-based machine learning network 400 and the decoder 440 can be implemented using one or more corresponding transformer-based decoder layers of the example transformer-based machine learning network 400 (e.g., as described above with respect to the encoder-decoder transformer architecture).

Figure 5:
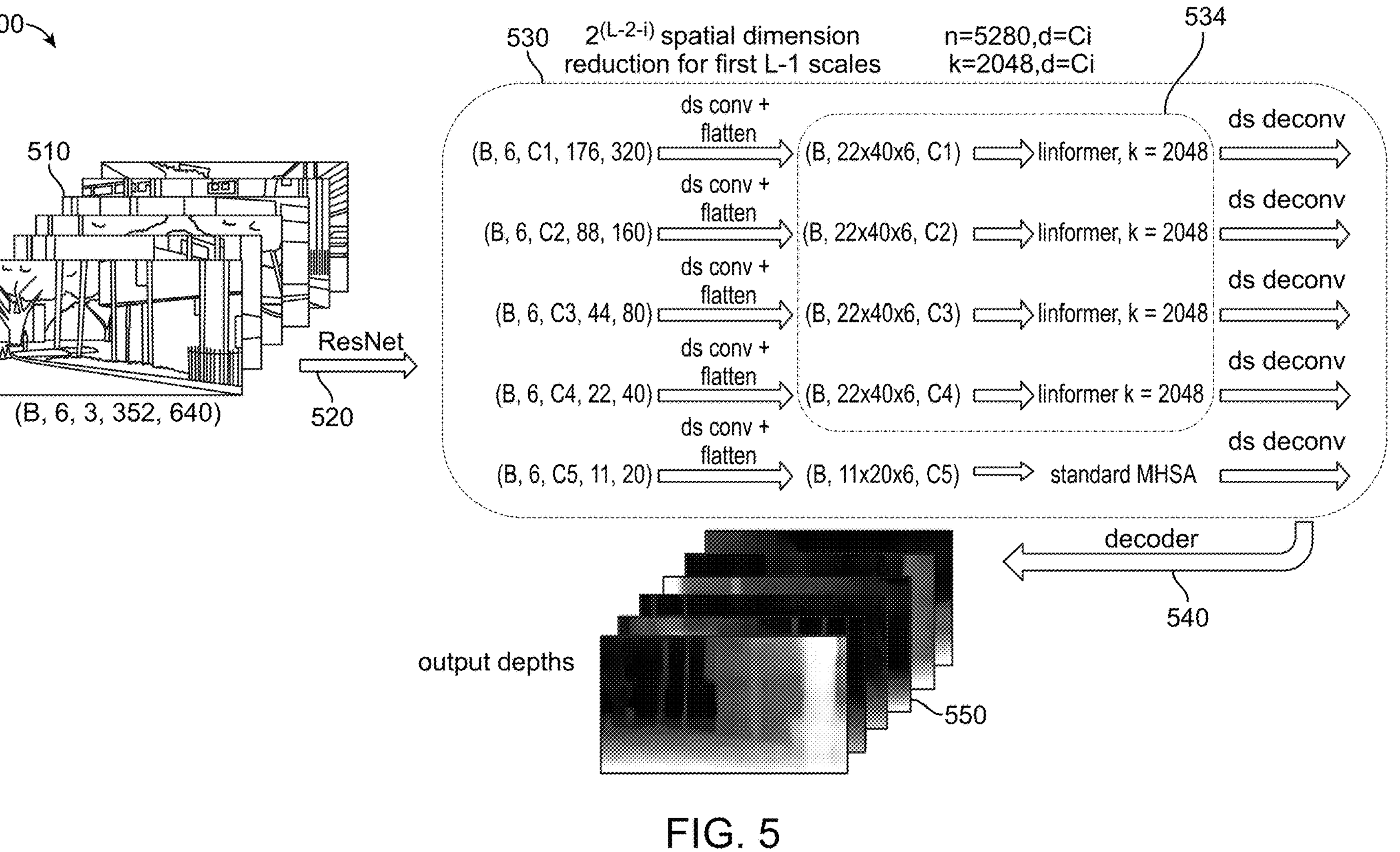
FIG. 5 is a diagram illustrating an example transformer-based machine learning network that includes linear transformer layers that can be used to perform cross-view feature processing with a linear computational complexity, in accordance with some examples.

FIG. 5 is a diagram illustrating an example transformer-based machine learning network 500 that includes linear transformer (e.g., linformer) layers that can be used to perform cross-view feature processing with a linear computational complexity. In one illustrative example, the transformer-based machine learning network 500 can be used to determine cross-view attention for performing one or more visual perception tasks based on a multi-view input image data 510. In some aspects, the multi-view input image data 510 can be the same as or similar to one or more (or both) of the multi-view input image data 310 illustrated in FIG. 3 and the multi-view input image data 410 illustrated in FIG. 4. For example, the multi-view image data 510 can have a size or dimensions or (B, 6, 3, 352, 640), indicating that the multi-view image data 510 includes (e.g., at each time step represented in the multi-view image data 510) RGB image data captured by or associated with six different views/cameras, each RGB image data having three channels with pixel dimensions of 352×640.

In one illustrative example, the transformer-based machine learning network 500 can include a plurality of linear transformer layers 534 (e.g., included in a plurality of transformer layers 530) that are associated with a linear computational complexity O(n) with respect to input sequence length (e.g., input image resolution of the multi-view input image data 510). In some examples, the plurality of transformer layers 530 can be the same as or similar to the one or more attention layers 330 illustrated in FIG. 3. A visual perception task output 550 can be the same as or similar to the visual perception task output 350 illustrated in FIG. 3 and/or the visual perception task output 450 illustrated in FIG. 4. In some aspects, the visual perception task output 550 illustrated in FIG. 5 can have a higher resolution than the visual perception task output 450 illustrated in FIG. 4 and/or the visual perception task output 350 illustrated in FIG. 3, based on using the linear transformer layers 534 to generate higher resolution feature maps for determining attention. In one illustrative example, the linear transformer layers 534 can determine attention (e.g., self-attention and/or cross-attention) for features generated from the multi-view input image data 510 using as input feature maps that have a greater resolution and a greater quantity of features than those associated with the MHSA layers 430 illustrated in FIG. 4.

For example, the linear transformer layers (e.g., linformer layers) 534 can receive as input feature maps having a spatial dimension of 22×40×6, which can include four times as many features (e.g., n=5280) as the quantity of features included in the input feature maps of spatial dimension 11×20×6 depicted in FIG. 4 (e.g., n=1320). In some aspects, the linear transformer layers 534 can determine an attention output associated with the input feature maps of spatial dimensions 22×40×6 with approximately the same computational complexity, time, and/or resources associated with using the MHSA layers 430 of FIG. 4 to determine an attention output associated with the input feature maps of spatial dimensions 11×20×6.

The multi-view input image data 510 can be provided as input to an image encoder 520, which in some aspects can be the same as or similar to the image encoder 420 illustrated in FIG. 4. For example, the image encoder 520 can generate as output a corresponding set of features or embeddings associated with the multi-view image data 510. In some cases, the image encoder 520 can be a CNN implementing a ResNet architecture (e.g., such as ResNet34, among others).

In one illustrative example, the transformer-based machine learning network 500 can include a plurality of attention layers 530 for determining an attention (e.g., self-attention, cross-attention) associated with the features generated by image encoder 520 using the multi-view image data 510 as input. In some aspects, the attention layers 530 can include or otherwise be used to implement a plurality of different scales. In some examples, the attention layers 530 can include or be used to implement five scales that are the same as or similar to the five scales illustrated in FIG. 4 and described above. For example, each scale included in the plurality of scales can receive as input a set of features having an increased quantity of channels relative to the three channels (e.g., RGB channels) included in the multi-view input image data 510 and having a decreased spatial or pixel resolution relative to that of the multi-view input image data 510. In some cases, the five scales included in attention layers 530 can receive as input from image encoder 520 a corresponding five feature sets (B, 6, C1, 176, 320), (B, 6, C2, 88, 160), . . . (B, 6, C5, 11, 20) that are the same as the five feature sets generated by image encoder 420 and provided to the five scales included in the MHSA attention layers 430 illustrated in FIG. 4.

Each scale of the plurality of scales included in attention layers 530 can include one or more convolution (e.g., DS convolution) and flattening layers that generate as output a set of spatially reduced features based on the feature sets provided to each respective one of the scales. For example, the first scale included in attention layers 530 can include one or more convolution and flattening layers that receive as input (e.g., from image encoder 520) a feature set of (B, 6, C1, 176, 320features and generate as output a set of high-resolution spatially reduced features (B, 22×40×6, C1), etc.

In one illustrative example, all but the last (e.g., smallest) scale included in the plurality of scales implemented by attention layers 530 can receive as input a high-resolution feature map (e.g., such as the high-resolution feature maps of size (B, 22×40×6, Ci) illustrated in FIG. 5). For example, the attention layers 530 include five scales, the first four of which are associated with a linformer attention layer and utilize a high-resolution feature map of size (B, 22×40×6, Ci). The last (e.g., smallest) scale included in attention layers 530 can be the same as the last (e.g., smallest) scale included in the MHSA attention layers 430 illustrated in FIG. 4. For example, the last/fifth scale included in attention layers 530 can be implemented using an MHSA attention layer that receives as input a lower-resolution feature map of size (B, 11×20×6, C5).

In some aspects, a feature size associated with the four linformer attention layers included in the set of linformer layers 534 illustrated in FIG. 5 can be greater than the feature size associated with the MHSA attention layers 430 illustrated in FIG. 4. For example, each linformer attention layer included in the set of linformer layers 534 can include a high resolution 22×40×6 feature map that includes $n_{linformer}$=22*40*6=5280 features. The feature size associated with the relatively low resolution 11×20×6=feature maps provided to the MHSA attention layers 430 illustrated in FIG. 4 can be $n_{MHSA}$=11*20*6=1320 features.

In some aspects, the set of linformer layers 534 included in the attention layers 530 of FIG. 5 can be associated with a spatial dimension reduction. For example, a spatial dimension reduction can be applied for the first four scales included in or otherwise implemented by the attention layers 530. In some aspects, the spatial dimension reduction can be applied for each respective scale that is associated with a linformer attention layer (e.g., the first four scales illustrated in FIG. 5). In one illustrative example, the spatial dimension reduction can be a spatial dimension reduction of $2^{(L-2-i)}$, where L represents the total quantity of scales and i represents the i-th scale. For example, the plurality of attention layers 530 includes five layers (e.g., L=5) and a spatial dimension reduction of $2^{(5-2-i)}=2^{(3-1)}$ can be applied for each of the first four scales.

In one illustrative example, each linear attention layer included in the set of linear attention layers 534 can include one or more linformer layers or other linear complexity transformer and/or attention layers. In some aspects, each linear attention layer (e.g., linformer layer) can be associated with a fixed feature map size k. For example, the four linformers 534 can each be associated with a fixed resolution k=2048. In one illustrative example, a linformer (e.g., or other linear attention layer and/or other linear attention transformer) can be used to determine self-attention (e.g., or cross-attention) in linear time and memory complexity with respect to input sequence length. For example, a linformer can use two linear projection matrices to determine the key and value inputs (e.g., the key and value inputs described previously above with respect to the transformer architecture).

In one illustrative example, the original key and value layers associated with a transformer may be (n×d)-dimensional. As illustrated in FIG. 5, the original key and value layers may be (5280×Ci)-dimensional, based on n=22*40*6=5280 and d=Ci. For example, the original key and value layers associated with the first scale of the plurality of attention layers 530 may be (5280×C1)-dimensional, the original key and value layers associated with the second scale of the plurality of attention layers 530 may be (5280×C2)-dimensional, etc.

Each linformer included in the plurality of linformers 534 can project the original (n×d)-dimensional key and value layers into (k×d)-dimensional projected key and value layers, respectively. For n>k, the linformer parameter k represents a fixed resolution reduction from the original feature size n. For example, as illustrated in FIG. 5, each linformer included in the plurality of linformers 534 can implement a fixed resolution reduction from the original feature size of n=5280 to the fixed resolution k=2048. In some aspects, the (k×d)-dimensional projected key and value layers can be used to compute an (n×k)-dimensional context mapping matrix using scaled dot-product attention, which can subsequently be used to determine context embeddings for each head (e.g., each head;) associated with a multi-headed self-attention. In some examples, the context embeddings can be determined in O(nk) time and space complexity. In some cases, for a small projected dimension k (e.g., such that k<<n), the memory and space consumption associated with determining attention can be significantly reduced such that the full $O(n^2)$ complexity attention determination can be approximated in linear, O(n) complexity in time and space.

In one illustrative example, the linear attention output determined by each linformer scale included in the plurality of linformers 534 can be provided to one or more deconvolution (e.g., DS deconvolution layers), in a manner the same as or similar to that described with respect to the DS deconvolution layers illustrated in FIG. 4. The decoder 540 can receive the output(s) of the DS deconvolution layer(s) and may be the same as or similar to the decoder 440 illustrated in FIG. 4. The decoder 540 can generate as output a plurality of visual perception task outputs 550 associated with the multi-view input image data 510 and a given visual perception task performed using the transformer-based machine learning network 500. For example, when the visual perception task is a depth estimation task, the decoder 540 can generate as output a plurality of depth maps as the visual perception task outputs 550 associated with the multi-view input image data 510 (e.g., one depth map output for each respective view included in the six views of multi-view input image data 510).

Based on using the plurality of linear attention layers 534 (e.g., linformers), the systems and techniques can be used to provide higher-resolution attention for cross-view feature processing (e.g., cross-view feature processing for a visual perception task associated with the multi-view input image data 510). In some aspects, the plurality of linear attention layers 534 (e.g., linformers) can be used to implement attention computation having an attention computation cost that is linear with respect to the input resolution (e.g., the input image resolution associated with the multi-view input image data 510). For example, the plurality of linear attention layers 534 (e.g., linformers) can be used to determine attention using feature maps with a 2× size increase (e.g., a 4× increase in feature count, n) relative to existing $O(n^2)$ complexity attention, using an approximately equal computational complexity and/or computational resources as the existing $O(n^2)$ complexity attention computation. In some examples, based on computing attention using higher resolution feature maps for a given computational complexity, the systems and techniques can be used to determine the one or more visual perception task outputs 550 with improved accuracy. For example, higher resolution feature maps used for a depth estimation visual perception task can be associated with improved accuracy and/or reduced error in the resulting depth map output(s) 550.

Figure 6:
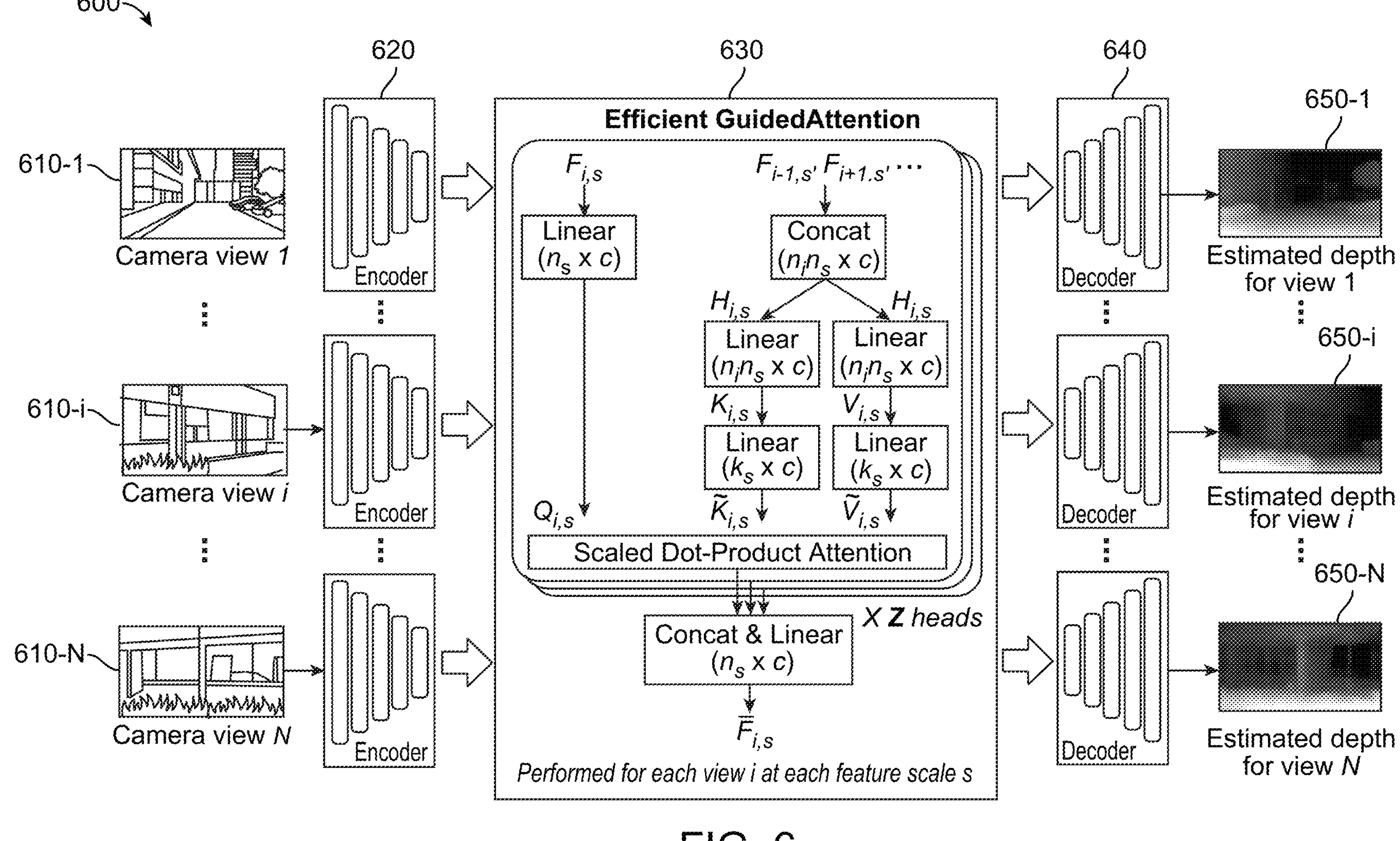
FIG. 6 is a diagram illustrating an example architecture for a transformer-based machine learning network that includes linear transformer layers for efficient guided attention (EGA)-depth attention, in accordance with some examples.

FIG. 6 is a diagram illustrating an example architecture 600 for a transformer-based machine learning network that includes linear transformer layers for efficient guided attention (EGA)-depth attention, in accordance with some examples. In one illustrative example, the architecture 600 can be used to perform efficient guided attention (EGA) for self-supervised multi-camera depth estimation (e.g., also referred to as EGA-Depth). For instance, the EGA-Depth architecture 600 can utilize relatively higher resolution for visual features and camera views from previous time steps to improve depth estimation accuracy for a plurality of depth estimation outputs (e.g., the multi-view estimated depth maps 650-1, . . . , 650-I, . . . , 650-N).

In some aspects, N cameras or imaging devices can be used to obtain a plurality of multi-view images 610-1, . . . , 610-*i*, . . . , 610-N. For example, N cameras or imaging devices can be used to each capture a respective image corresponding to a respective view of a scene (e.g., N cameras can be used to obtain N multi-view images). In some cases, the plurality of multi-view images 610-1, . . . , 610-*i*, . . . , 610-N can be the same as or similar to one or more of the multi-view images 310 of FIG. 3, the multi-view images 410 of FIG. 4, and/or the multi-view images 510 of FIG. 5.

For each camera $i \in \{1, \ldots, N\}$, the corresponding captured image (e.g., 610-*i*) can be provided to a respective machine learning encoder network 620 configured to extract multi-scale visual feature maps, $F_{i,s} \in \mathbb{R}^{n_s \times c}$, where $s \in \{1, \ldots, N_s\}$ represents the feature map scale with $N_s$ being the number of scales (e.g., $N_s=5$ for an example ResNet encoder and for the examples described above with respect to FIGS. 4 and 5). In some aspects, the respective encoder networks 620 can be the same as or similar to an encoder network used to generate the multi-scale features 320 of FIG. 3, the encoder network 420 of FIG. 4, and/or the encoder network 520 of FIG. 5.

Each multi-scale visual feature map $F_{i,s}$ can include $n_s=H_s=W_s$ spatial elements, where $H_s$ represents the height of the feature map and $W_s$ represents the width of the feature map, at scale s and with a number c of feature channels. In some aspects, the example EGA-Depth architecture 600 can utilize flattened feature maps $F_{i,s}$.

An EGA attention engine 630 can receive the multi-scale visual feature maps $F_{i,s}$ as input from the plurality of encoder networks 620. In some examples, EGA attention engine 630 can be the same as or similar to the attention layers 330 of FIG. 3, the attention layers 530 of FIG. 5, etc. The EGA attention engine 630 can include a plurality of linear transformer (e.g., linformer) layers. For instance, the EGA attention engine 630 can include a plurality of linformer layers that are the same as or similar to the plurality of linformer layers 534 of FIG. 5.

The EGA attention engine 630 can process and/or analyze the plurality of multi-scale visual feature maps $F_{i,s}$ (e.g., corresponding to the plurality of multi-view input images 610-1, . . . , 610-*i*, . . . , 610-N) to find and utilize respective cross-correlations. The respective cross-correlations between the multi-scale visual feature maps $F_{i,s}$ can be used to refine the input multi-scale visual feature maps $F_{i,s}$ into refined multi-scale visual feature maps $\overline{F}_{i,s}$ (e.g., output feature maps of the EGA attention engine 630) for $i \in \{1, \ldots, N\}$ and $s \in \{1, \ldots, N_s\}$.

For each of the N cameras used to obtain the N multi-scale input images 610-1, . . . , 610-*i*, . . . , 610-N, the respective updated (e.g., refined) multi-scale feature maps $\overline{F}_{i,s}$ are fed into a common decoder 640 to generate the respective estimated depth map 650-1, . . . , 650-*i*, . . . 650-N. In some aspects, the common decoder 640 can be a common decoder architecture that is used to perform decoding of the respective multi-scale refined feature map $\overline{F}_{i,s}$ for each view or input image. In some examples, a separate instance of common decoder 640 can be provided for each encoder instance 620. In some cases, the number of encoders 620 and the number of decoders 640 is equal. For example, EGA-Depth architecture 600 can include N encoders 620 and N decoders 640.

The decoder(s) 640 can be the same as or similar to one or more of a decoder associated with generating the visual perception task output(s) 350 of FIG. 5, the decoder 440 of FIG. 4, the decoder 540 of FIG. 5, etc. The estimated depth maps 650-1, . . . , 650-*i*, . . . , 650-N can be the same as or similar to the visual perception task output(s) 350 of FIG. 3, the output depth information 450 of FIG. 4, the output depth information 550 of FIG. 5, etc.

In existing approaches, self-attention may be determined for the input feature maps $F_{i,s}$ of all the views N for each scale $s \in \{1, \ldots, N_s\}$ which incurs expensive and unnecessary computations based on the attention complexity being quadratic with respect to both the spatial size of the feature map and the number of views (e.g., considerable computation is wasted on attending across views with little or no overlap).

The systems and techniques described herein can determine attention information based on, for each $F_{i,s}$, utilizing the features of the neighboring views to determine attention information for $F_{i,s}$. For instance, the EGA attention engine 630 can determine attention for each $F_{i,s}$ using only features of neighboring views associated with the particular $F_{i,s}$. In one illustrative example, the EGA attention engine 630 is configured to focus attention processing on views with meaningful overlaps while avoiding spending computation over non-overlapping and/or relatively small overlapping views.

In one illustrative example, the EGA attention engine 630 can include and/or implement guided attention in place of standard self-attention. For instance, the input multi-view feature map $F_{i,s}$ can be used to determine the query and the stacked features of the neighboring views, $H_{i,s}=\text{concat}(F_{i-1,s}, F_{i+1,s}, \ldots) \in \mathbb{R}^{(n_i \cdot n_s) \times c}$, which can be used to compute keys and values, where $n_i$ represents the number of neighboring views and $F_{i-1,s}$, $F_{i+1,s}$, . . . represent the respective feature maps of each of the $n_i$ neighboring views. In some aspects, the query, key, and value can be given as:

$$Q_{i,s} = F_{i,s} W_{q,i,s} \quad \text{Eq. (1)}$$

-continued $$K_{i,s} = H_{i,s} W_{k,i,s}$$

$$V_{i,s} = H_{i,s} W_{v,i,s}$$

In the example of Eq. (1), $W_{q,i,s}$, $W_{k,i,s}$, $W_{v,i,s} \in \mathbb{R}^{c \times c}$ are learnable projection matrices. In one illustrative example, the EGA attention engine 630 can calculate attention information for the input multi-view feature map $F_{i,s}$ as:

$$\underbrace{softmax\left(\frac{Q_{i,s}K_{i,s}^T}{\sqrt{c}}\right)}_{n_s \times (n_i \cdot n_s)} \cdot \underbrace{\tilde{V}_i}_{(n_i \cdot n_s) \times c} \quad \text{Eq. (2)}$$

Based on determining the attention information for the input multi-view feature map $F_{i,s}$ based on Eq. (2), the guided attention implemented by EGA attention engine 630 can be associated with a linear complexity with respect to the number of participating views $n_i$. In some aspects, the number of participating views $n_i$ is smaller than the number of total views N included in the plurality of multi-view input images 610-1, . . . , 610-*i*, . . . , 610-N (e.g., based on the participating views $n_i$ being selected as the subset of views with meaningful overlaps with the view of the analyzed feature map $F_{i,s}$).

In some cases, the guided attention implementation associated with Eq. (2) may be quadratic in complexity with respect to the length of the feature (e.g., $n_s$). In one illustrative example, the systems and techniques can be configured to perform one or more further projections to bring the key and value (e.g., $K_{i,s}$ and $V_{i,s}$, respectively, of Eq. (1)) to a fixed token dimension:

$$\tilde{K}_{i,s} = P_{k,i,s} K_{i,s} \quad \text{Eq. (3)}$$

$$\tilde{V}_{is} = P_{v,i,s} V_{i,s}$$

Here, $P_{k,i,s}$, $P_{v,i,s} \in \mathbb{R}^{k_s \times (n_i \cdot n_s)}$, $\tilde{K}_{i,s} \in \tilde{V}_{i,s} \in \mathbb{R}^{k_s \times c}$. The term $k_s$ represents a configured constant number for each feature scale. Computing attention using Eq. (3) and Eq. (4) gives:

$$\underbrace{softmax\left(\frac{Q_{i,s}\tilde{K}_{i,s}^T}{\sqrt{c}}\right)}_{n_s \times k_s} \cdot \underbrace{\tilde{V}_{i,s}}_{k_s \times c} \quad \text{Eq. (4)}$$

In one illustrative example, the attention calculation of Eq. (4) can be implemented by the EGA attention engine 630 with computational complexity that scales linearly with respect to the input feature size $n_s$. In some aspects, the EGA-Depth architecture 600 of FIG. 6 can be used to provide efficient attention determination across multiple views, based on determining attention information over overlapping views of the input plurality of views (e.g., the multiple views associated with the multi-view input images 610-1, . . . , 610-N) and/or based on removing quadratic complexity from aspects of the attention calculation.

In some aspects, the systems and techniques can determine attention information based on multi-view input images and corresponding temporal information. For instance, the EGA attention engine 630 of FIG. 6 can be used to incorporate more views and/or frames at inference time of a self-supervised multi-camera depth estimation network (e.g., such as architecture 600). In one illustrative example, for each camera view, the systems and techniques can jointly stack features from previous frames and features from neighboring views to compute key and value in the attention.

For example, the features of the neighboring views at the current time t can be $$F_{i-1,s}^t, F_{i+1,s}^t, \ldots,$$

and the features of the previous frames can be $$F_{i,s}^{t-1}, F_{i,s}^{t-2}, \ldots .$$

The systems and techniques can generate stacked reference features for view i at time t as $$H_{i,s}^t = concat\left(F_{i-1,s}^t, F_{i+1,s}^t, \ldots, F_{i,s}^{t-1} F_{i,s}^{t-2}, \ldots\right) \in \mathbb{R}^{((n_i \cdot n_t) \cdot n_s) \times c},$$

where $n_t$ is the number of previous frames to be included in the temporal information. In some aspects, given $$F_{i,s}^t \text{ and } H_{i,s}^t,$$

the systems and techniques can determine guided attention information as described above (e.g., the EGA attention engine 630 can determine guided attention information as described above, using $$F_{i,s}^t \text{ and } H_{i,s}^t$$

to include temporal information in the attention determination process).

As mentioned previously, the systems and techniques described herein can be utilized to perform one or more visual perception tasks using spatially distributed views (e.g., multi-view input image data, such as the multi-view input image data 310 illustrated in FIG. 3, the multi-view input image data 410 illustrated in FIG. 4, the multi-view input image data 510 illustrated in FIG. 5, and/or the multi-view input image data 610-1, . . . , 610-*i*, . . . , 610-N of FIG. 6, etc.) that include at least partial overlap between two or more of the multiple views. In some examples, multi-view input image data may include at least partial overlap between a first set of views included in the multiple views and may include zero overlap between a second set of views included in the multiple views. For example, multi-view input image data captured using a front, left, right, and back camera (e.g., provided on a vehicle, an XR or AR headset, etc.) may include at least partial overlap between the front, left, and right camera views and at least partial overlap between the back, left, and right camera views, while including zero overlap between the front and back camera views and zero overlap between the left and right camera views. In one illustrative example, determining attention (e.g., cross-attention) between two or more non-overlapping camera views can be inefficient, based on the two or more non-overlapping camera views being unrelated to one another.

In some examples, existing techniques for determining cross-view attention for a multi-view input image data is based on applying attention (e.g., self-attention, cross-attention, etc.) to all of the views included in the multiple views. As mentioned previously, existing techniques for determining attention can incur $O(n^2)$ complexity based on determining the attention between each token of the n tokens included in the current attention layer and each of the n tokens included in the previous attention layer. In some examples, applying attention to all of the views (e.g., including zero overlap views) included in a multi-view input image data can be inefficient, and may be associated with a large memory usage during both training and inference of a machine learning network (e.g., transformer-based machine learning network) used to perform the attention determinations.

In one illustrative example, the systems and techniques described herein can implement view partitioning for one or more attention determinations performed for a multi-view input image data that includes views with at least a partial overlap and that includes views with zero overlap. For example, the systems and techniques can determine attention (e.g., cross-attention) between one or more sets of input image views (e.g., spatial camera viewpoints), wherein each input image view included in a respective set includes at least a partial overlap with each remaining input image view included in the respective set.

In some aspects, the view partitioning described herein can be used to improve an efficiency (e.g., memory consumption during training and/or inference, etc.) of cross-view attention determination performed using existing $O(n^2)$ complexity attention layers. In some aspects, the view partitioning described herein can be used to improve an efficiency (e.g., memory consumption during training and/or inference, etc.) of cross-view attention determination performed using the improved linear (e.g., $O(n^2)$ complexity attention described above with respect to FIGS. 3-6.

Figure 7:
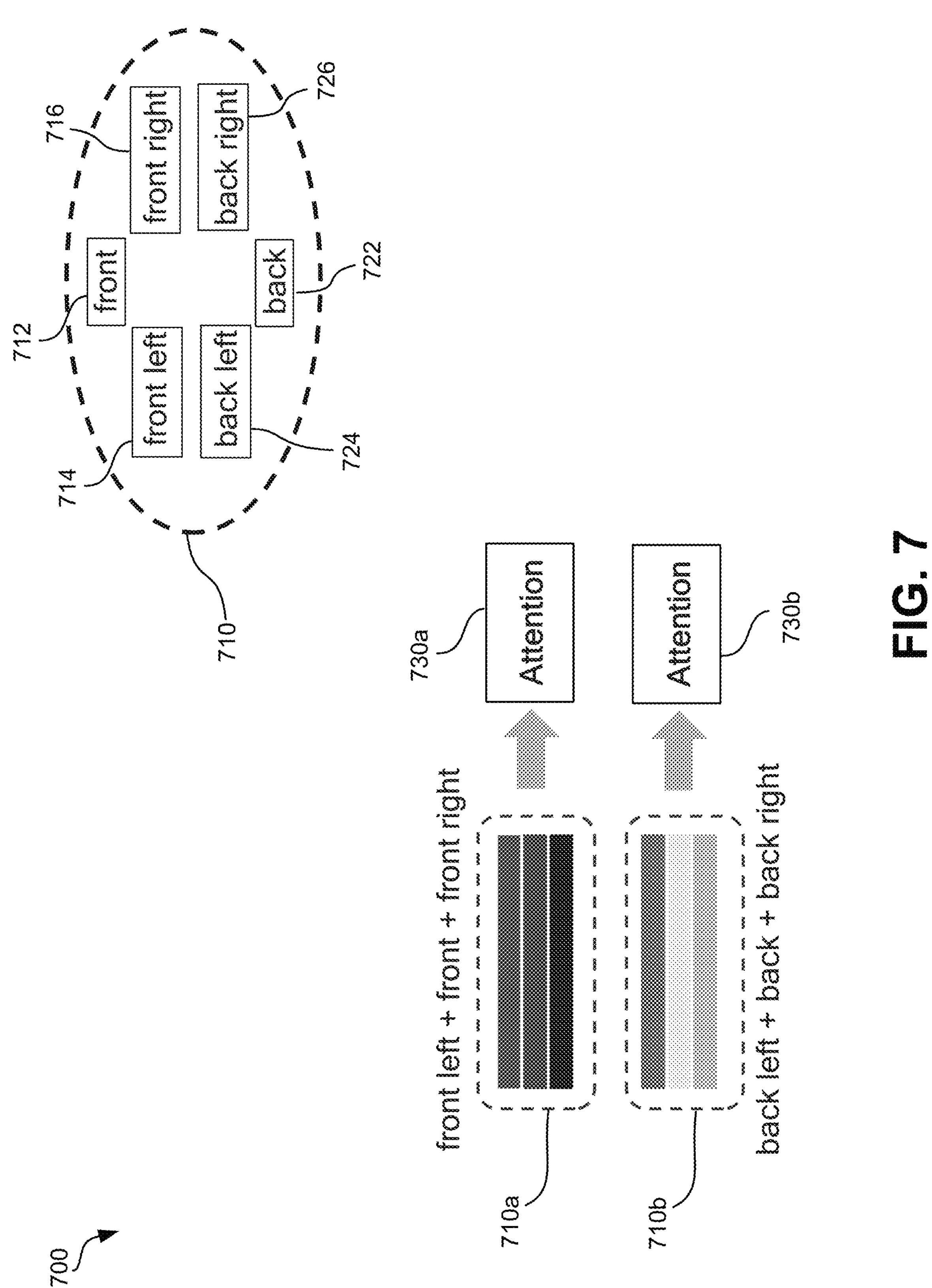
FIG. 7 is a diagram illustrating an example view partitioning that can be used to determine attention for performing a machine learning-based visual perception task, in accordance with some examples.

For example, FIG. 7 is a diagram illustrating an example view partitioning 700 that can be used to determine attention (e.g., cross-attention), including cross-view attention and/or attention for performing a machine learning-based visual perception task. In one illustrative example, a multi-view input image data (e.g., such as the multi-view input image data 310 illustrated in FIG. 3, the multi-view input image data 410 illustrated in FIG. 4, the multi-view input image data 510 illustrated in FIG. 5, and/or the multi-view input image data 610-1, . . . , 610-*i*, . . . , 610-N of FIG. 6, etc.) can be determined using a plurality of cameras 710 that are associated with a corresponding plurality of spatial views. For example, the plurality of cameras 710 may be included on a vehicle, XR or AR headset, smartphone or other mobile computing device, IoT device and/or IoT camera network, etc.

As illustrated, the plurality of cameras 710 may be associated with fixed relative positions relative to one another. For example, the plurality of cameras 710 can include a front camera 712, a front left camera 714, a front right camera 716, a back left camera 724, a back right camera 726, and a back camera 722. In some aspects, the plurality of cameras 710 can include one or more sets or groups of cameras that each capture a view that is at least partially overlapping with some (or all) of the respective views captured by the remaining cameras included in the same group.

For example, the respective spatial views captured by the plurality of cameras 710 can be partitioned into a first group of partially overlapping views 710*a* and a second group of partially overlapping views 710*b*. In some examples, the first group of partially overlapping views 710*a* can include the front camera view 712, the front left camera view 714, and the front right camera view 716. In some examples, the second group of partially overlapping views 710*b* can include the back camera view 722, the back left camera view 724, and the back right camera view 726.

In one illustrative example, each group of overlapping camera views (e.g., the first and second groups of partially overlapping camera views 710*a*, 710*b*) can be include a unique set of individual camera views. For example, in some cases, each given camera view included in the plurality of camera views from the cameras 710 is included in up to one group of overlapping camera views (e.g., a given camera view is not included in multiple groups of overlapping camera views). In some examples, a given camera view may be included in two more different groups of overlapping camera views.

In some aspects, some (or all) of the groups of overlapping camera views (e.g., such as the first and second groups of overlapping camera views 710*a*, 710*b*, respectively) may be non-overlapping with some (or all) of the remaining groups of overlapping camera views. For example, the first group of overlapping camera views 710*a* may have zero overlap with the second group of overlapping camera views 710*b* (e.g., the front left camera view 714 and the back left camera view 724 may be non-overlapping, and the front right camera view 716 and the back right camera view 726 may be non-overlapping).

In some examples, some (or all) of the groups of overlapping camera views may be at least partially overlapping with some (or all) of the remaining groups of overlapping camera views. For example, the first group of overlapping camera views 710*a* may include one or more camera views that have at least a partial overlap with one or more camera views included in the second group of overlapping camera views 710*b*. In one illustrative example, the front left camera view 714 included in the first group of overlapping camera views 710*a* may at least partially overlap with the back left camera view 724 included in the second group of overlapping camera views 710*b*. Additionally, or alternatively, the front right camera view 716 included in the first group of overlapping camera views y610*a* may at least partially overlap with the back right camera view 726 included in the second group of overlapping camera views 710*b*.

In some aspects, various different view partitions can be utilized for a given set of multiple cameras and/or multiple camera views (e.g., such as the plurality of cameras/camera views 710). For example, a first group of partially overlapping camera views may include the front camera view 712 and the front left camera view 714, a second group of partially overlapping camera views may include the back left camera view 724 and the back camera view 722, and a third group of partially overlapping camera views may include the back right camera view 726 and the front right camera view 716; etc. In one illustrative example, the view partitioning of multiple camera views (e.g., included in a multi-view input image data) can be performed for a multi-view input image data that includes multiple views over time. For example, view partitioning can be performed to generate one or more groups of at least partially overlapping camera views wherein each group includes multiple camera views each captured at different points in time and including at least a partial overlap with one or more (or all) of the remaining multiple camera views included in the same group.

In one illustrative example, each group of at least partially overlapping camera views (e.g., such as groups 710*a*, 710*b*) can be provided as input to a separate attention engine. For example, the first group of partially overlapping camera views 710*a* can be provided to a first set of one or more attention layers 730*a* and the second group of partially overlapping camera views 710*b* can be provided to a second set of one or more attention layers 730*b*. The first and second sets of attention layers 730*a*, 730*b*, respectively, can be the same or similar. In some cases, the first and second sets of attention layers 730*a*, 730*b*, respectively, can be different from one another.

In one illustrative example, the first set of attention layers 730*a* and the second set of attention layers 730*b* can be the same as or similar to the one or more attention layers 330 illustrated in FIG. 3. In another illustrative example, the first set of attention layers 730*a* and the second set of attention layers 730*b* can be the same as or similar to the plurality of MHSA attention layers 430 illustrated in FIG. 4. In another illustrative example, the first set of attention layers 730*a* and the second set of attention layers 730*b* can be the same as or similar to the plurality of attention layers 530 and/or the plurality of linformer layers 534 illustrated in FIG. 5. In another illustrative example, the first set of attention layers 730*a* and the second set of attention layers 730*b* can be the same as or similar to the plurality of linear attention layers (e.g., linformer layers) included in EGA attention engine 630 of FIG. 6.

In some aspects, the view partitioning of a given set of multiple cameras and/or multiple camera views included in a multi-view input image data (e.g., such as the plurality of cameras/camera views 710 illustrated in FIG. 7) can be pre-determined. For example, the view partitioning can be pre-determined based on an offline analysis of a relative physical or spatial positioning of each camera included in the plurality of cameras 710. In some examples, the view partitioning can be determined dynamically, for example based on one or more inputs indicative of camera intrinsic information and/or indicative of a relative physical or spatial positioning of each camera included in the plurality of cameras 710. In some cases, the systems and techniques can perform an image content analysis of the different camera views included in a multi-view input image data to determine one or more sets of camera views that are at least partially overlapping with one another. Based on the image content analysis and/or identified sets of camera views that are at least partially overlapping, the systems and techniques can generate the view partitioning of two or more sets of at least partially overlapping camera views and provide each respective set of at least partially overlapping camera views to a corresponding one or more attention layers for performing one or more visual perception tasks.

Figure 8:
FIG. 8 is a flow diagram illustrating an example of a process for processing image and/or video data, in accordance with some examples.
Figure 8:
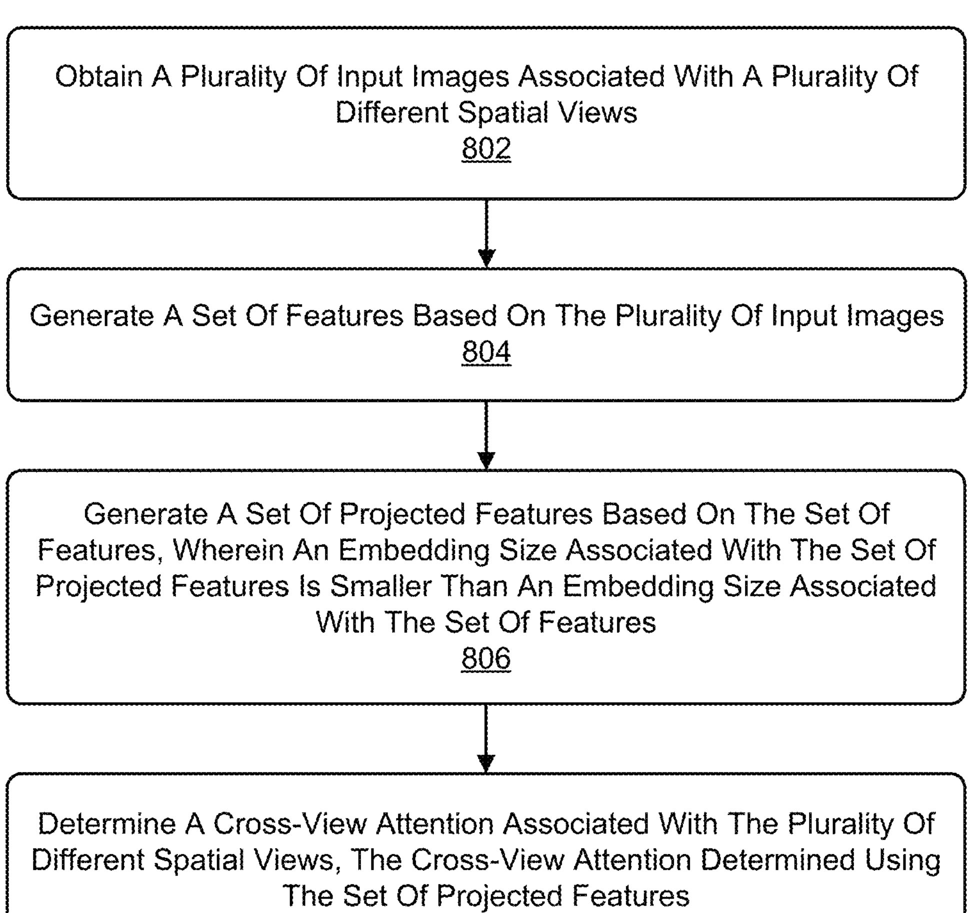

FIG. 8 is a flowchart illustrating an example of a process 800 for processing image and/or video data. Although the example process 800 depicts a particular sequence of operations, the sequence may be altered without departing from the scope of the present disclosure. For example, some of the operations depicted may be performed in parallel or in a different sequence that does not materially affect the function of the process 800. In other examples, different components of an example device or system that implements the process 800 may perform functions at substantially the same time or in a specific sequence.

At block 802, the process 800 includes obtaining a plurality of input images associated with a plurality of different spatial views. For example, the plurality of input images can include the multi-view input image data 310 illustrated in FIG. 3, the multi-view input image data 410 illustrated in FIG. 4, the multi-view input image data 510 illustrated in FIG. 5, and/or the multi-view input image data 610-1, . . . , 610-*i*, . . . , 610-N of FIG. 6. For example, the plurality of different spatial views can be the same as or similar to the N different spatial views (e.g., camera views) associated with the input images 610-1, . . . , 610-*i*, . . . , 610-N of FIG. 6. In some cases, the plurality of input images can be spatially distributed images associated with different spatial views. For example, the plurality of different spatial views can be associated with a scene, and each respective input image included in the plurality of input images can be associated with a different spatial view of the scene.

In some examples, each respective input image included in the plurality of input images can be obtained using a respective camera included in a plurality of cameras. In some examples, the plurality of input images can be obtained using one or more cameras, and each respective input image included in the plurality of input images can be associated with a different time or a different spatial view.

At block 804, the process 800 includes generating a set of features based on the plurality of input images. For example, the set of features can be generated as multi-scale features, such as the multi-scale features 320 illustrated in FIG. 3. In some cases, the set of features can include a plurality of multi-scale feature maps associated with the plurality of input images. Each respective multi-scale feature map included in the plurality of multi-scale feature maps can be associated with a different embedding size. In some cases, the set of features can include a respective multi-scale feature map associated with each input image include in the plurality of input images. For instance, the set of features can include a respective multi-scale visual feature map for each image of the plurality of input images.

In some examples, the set of features generated based on the plurality of input images can be generated using one or more machine learning encoder networks. For instance, the one or more machine learning encoder networks can be the same as or similar to one or more of the encoder network 420 of FIG. 4, the encoder network 520 of FIG. 5, and/or the plurality of encoder networks 620 of FIG. 6. In some cases, the set of features can be the same as or similar to the multi-scale visual feature maps, $F_{i,s} \in \mathbb{R}^{n_s \times c}$ of FIG. 6 (e.g., where $s \in \{1, \ldots, N_s\}$ represents the feature map scale with $N_s$ being the number of scales (e.g., $N_s=5$ for an example ResNet encoder).

At block 806, the process 800 includes generating a set of projected features based on the set of features, wherein an embedding size associated with the set of projected features is smaller than an embedding size associated with the set of features. For example, generating the set of projected features can include projecting each respective multi-scale feature map into a fixed embedding size associated with the set of projected features. In some examples, the set of projected features can be generated using the EGA attention engine 630 of FIG. 6. For instance, the set of projected features can be the same as or similar to the refined multi-scale visual feature maps $\overline{F}_{i,s}$ of FIG. 6 (e.g., output feature maps of the EGA attention engine 630 for $i \in \{1, \ldots, N\}$ and $s \in \{1, \ldots, N_s\}$).

In some cases, generating the set of projected features can be based on the EGA attention engine 630 of FIG. 6 receiving the multi-scale visual feature maps $F_{i,s}$ as input from the plurality of encoder networks 620 of FIG. 6. In some examples, the EGA attention engine 630 can be the same as or similar to the attention layers 330 of FIG. 3, the attention layers 530 of FIG. 5, etc. The EGA attention engine 630 can include a plurality of linear transformer (e.g., linformer) layers. For instance, the EGA attention engine 630 can include a plurality of linformer layers that are the same as or similar to the plurality of linformer layers 534 of FIG. 5.

In some examples, to generate the set of projected features, the EGA attention engine 630 of FIG. 6 can process and/or analyze the plurality of multi-scale visual feature maps $F_{i,s}$ (e.g., corresponding to the plurality of multi-view input images 610-1, . . . , 610-*i*, . . . , 610-N) to find and utilize respective cross-correlations. The respective cross-correlations between the multi-scale visual feature maps $F_{i,s}$ can be used to refine the input multi-scale visual feature maps $F_{i,s}$ into refined multi-scale visual feature maps $\overline{F}_{i,s}$ (e.g., the set of projected features).

In some examples, the set of projected features can be generated using one or more linear transformers and/or one or more linear transformer layers. For example, in some cases the set of projected features can be generated using one or more linformers, as illustrated in the set of linformers 534 of FIG. 5. In some cases, the fixed embedding size associated with the set of projected features can be given by one or more parameters associated with a linear transformer and/or linformer. For example, the fixed embedding size can be given by the parameter k illustrated in FIG. 5 (e.g., where k=2048). In some examples, the one or more linformers (e.g., linear layers) can be the same as or similar to the linear layers of EGA attention engine 630 of FIG. 6.

At block 808, the process 800 includes determining a cross-view attention associated with the plurality of different spatial views, the cross-view attention determined using the set of projected features. For example, the cross-view attention associated with the plurality of different spatial views can be determined using the scaled dot-product attention of the EGA attention engine 630 of FIG. 6. In some cases, determining the cross-view attention can comprise processing, using one or more linear transformers (e.g., linformers, linear layers of FIG. 6, etc.), the set of projected features (e.g., refined multi-scale visual feature maps $F_{i,s}$ of FIG. 6) to determine a cross-attention associated with each respective feature included in the set of projected features.

In some examples, one or more visual perception task outputs can be generated based on the cross-view attention. For example, the one or more visual perception task outputs can include one or more depth maps associated with the plurality of input images or one or more optical flow maps associated with the plurality of input images. In some cases, the one or more visual perception task outputs can include one or more object detection outputs associated with the plurality of input images or one or more segmentation masks associated with the plurality of input images. For example, the one or more visual perception task outputs can be the same as or similar to the visual perception task output(s) 350 of FIG. 3, the depth maps 450 of FIG. 4, the depth maps 550 of FIG. 5, and/or the estimated multi-view depth maps 650-1, . . . , 650-*i*, . . . , 650-N of FIG. 6, etc.

In some examples, the process 800 further includes generating a first set of projected features based on a first set of input images included in the plurality of input images and generating a second set of projected features based on a second set of input images included in the plurality of input images. For example, the first set of input images can be associated with a first set of spatial views having at least a partial overlap and the second set of input images can be associated with a second set of spatial views having at least a partial overlap. In some cases, the first and second sets of input images can be sub-sets of the plurality of input images, wherein the plurality of input images can include the multi-view input image data 310 illustrated in FIG. 3, the multi-view input image data 410 illustrated in FIG. 4, the multi-view input image data 510 illustrated in FIG. 5, and/or the multi-view input image data 610-1, . . . , 610-N of FIG. 6.

In some examples, the overlap between the first set of input images and the second set of input images can correspond to the number of neighboring views $n_i$ of the currently processed feature map $F_{i,s}$ and the corresponding neighboring view feature maps $F_{i-1,s}$, $F_{i+1,s}$ of the currently processed feature map $F_{i,s}$. In some cases, the overlap between the first set of input images and the second set of input images can correspond to the stacked features of the neighboring views, $H_{i,s}=\text{concat}(F_{i-1,s}, F_{i+1,s}, \ldots)\in\mathbb{R}^{(n_i \cdot n_s)\times c}$, generated using the EGA attention engine 630 of FIG. 6.

In some examples, the first set of input images included in the plurality of input images can be the same as or similar to the first group of partially overlapping views 710*a* illustrated in FIG. 7. The second set of input images included in the plurality of input images can be the same as or similar to the second group of partially overlapping views 710*b* illustrated in FIG. 7. For example, the first set of spatial views associated with the first set of input images can include a front left, front, and front right spatial view and the second set of spatial views associated with the second set of input images can include a back left, back, and back right spatial view, as illustrated in FIG. 7.

In some cases, the first set of input images can be different than the second set of input images. For example, each respective input image included in the first set of input images can overlap with at least a portion of one or more remaining input images included in the first set of input images. Each respective input image included in the second set of input images can overlap with at least a portion of one or more remaining input images included in the second set of input images. In some cases, each respective input image included in the first set of input images is non-overlapping with each respective input image included in the second set of input images.

In some examples, the process 800 further includes determining a first cross-view attention associated with the first set of spatial views, the first cross-view attention determined using the first set of projected features. For example, the first cross-view attention can be determined in a manner the same as or similar to that described above with respect to block 808. In some cases, the first cross-view attention can be determined using an attention engine implementing Eq. (2) and/or Eqs. (3) and (4), such as the EGA attention engine 630 of FIG. 6.

In some examples, the process 800 further includes determining a second cross-view attention associated with the second set of spatial views, the second cross-view attention determined using the second set of projected features. The second cross-view attention can be determined in a manner the same as or similar to that described above with respect to block 808. In some cases, the second cross-view attention can be determined using an attention engine implementing Eq. (2) and/or Eqs. (3) and (4), such as the EGA attention engine 630 of FIG. 6.

For example, the first cross-view attention can be determined using the first set of one or more attention layers 730*a* of FIG. 7 and the second cross-view attention can be determined using the second set of one or more attention layers 730*b* of FIG. 7. In some examples, the first set of one or more attention layers 730*a* and/or the second set of one or more attention layers 730*b* can be the same as or similar to the attention layers 530 and/or 534 illustrated in FIG. 5.

In some examples, the process 800 further includes generating one or more visual perception task outputs associated with the plurality of input images, based on the first cross-view attention and the second cross-view attention. For example, the one or more visual perception task outputs can include one or more depth maps associated with the plurality of input images or one or more optical flow maps associated with the plurality of input images. In some cases, the one or more visual perception task outputs can include one or more object detection outputs associated with the plurality of input images or one or more segmentation masks associated with the plurality of input images. In some examples, and as noted above, the one or more visual perception task outputs can be the same as or similar to the visual perception task output(s) 350 of FIG. 3, the depth maps 450 of FIG. 4, the depth maps 550 of FIG. 5, and/or the estimated multi-view depth maps 650-1, . . . , 650-*i*, . . . , 650-N of FIG. 6, etc.

In some examples, the processes described herein (e.g., process 800 and/or any other process described herein) may be performed by a computing device, apparatus, or system. In one example, the process 800 can be performed by a computing device or system having the computing device architecture 900 of FIG. 9. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 800 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
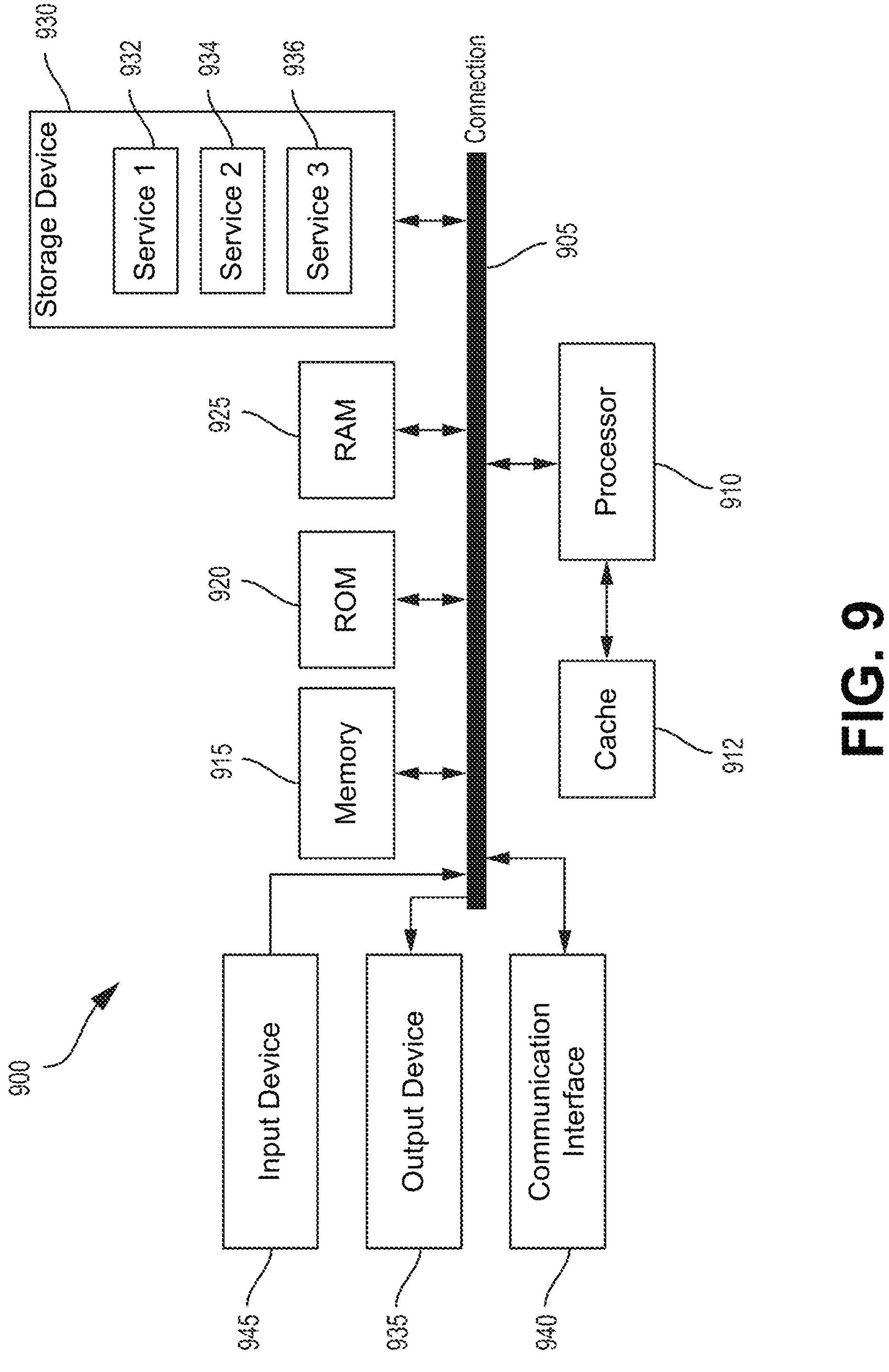
FIG. 9 is a block diagram illustrating an example of a computing system for implementing certain aspects described herein.

FIG. 9 illustrates an example computing device architecture 900 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 900 can implement the example linformer-based cross-attention machine learning network 500 of FIG. 5, can implement the EGA-Depth attention machine learning architecture 600 of FIG. 6, can implement the attention view-partitioning system 700 of FIG. 7, etc. The components of computing device architecture 900 are shown in electrical communication with each other using connection 905, such as a bus. The example computing device architecture 900 includes a processing unit (CPU or processor) 910 and computing device connection 905 that couples various computing device components including computing device memory 915, such as read only memory (ROM) 920 and random-access memory (RAM) 925, to processor 910.

Computing device architecture 900 can include a cache of high-speed memory connected directly with, in close proximity to, or integrated as part of processor 910. Computing device architecture 900 can copy data from memory 915 and/or the storage device 930 to cache 912 for quick access by processor 910. In this way, the cache can provide a performance boost that avoids processor 910 delays while waiting for data. These and other engines can control or be configured to control processor 910 to perform various actions. Other computing device memory 915 may be available for use as well. Memory 915 can include multiple different types of memory with different performance characteristics. Processor 910 can include any general-purpose processor and a hardware or software service, such as service 1 932, service 2 934, and service 3 936 stored in storage device 930, configured to control processor 910 as well as a special-purpose processor where software instructions are incorporated into the processor design. Processor 910 may be a self-contained system, containing multiple cores or processors, a bus, memory controller, cache, etc. A multi-core processor may be symmetric or asymmetric.

To enable user interaction with the computing device architecture 900, input device 945 can represent any number of input mechanisms, such as a microphone for speech, a touch-sensitive screen for gesture or graphical input, keyboard, mouse, motion input, speech and so forth. Output device 935 can also be one or more of a number of output mechanisms known to those of skill in the art, such as a display, projector, television, speaker device, etc. In some instances, multimodal computing devices can enable a user to provide multiple types of input to communicate with computing device architecture 900. Communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. Storage device 930 can include services 932, 934, 936 for controlling processor 910. Other hardware or software modules or engines are contemplated. Storage device 930 can be connected to the computing device connection 905. In one aspect, a hardware module that performs a particular function can include the software component stored in a computer-readable medium in connection with the necessary hardware components, such as processor 910, connection 905, output device 935, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific examples. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects and illustrative examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the illustrative examples in unnecessary detail. In other instances, well-known circuits, processes, algorithms, structures, and techniques may be shown without unnecessary detail in order to avoid obscuring the illustrative examples.

Individual aspects and illustrative examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some illustrative examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects and illustrative examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects and illustrative examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects and examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the illustrative examples disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for processing image data, the apparatus comprising: at least one memory; and at least one processor coupled to the at least one memory and configured to: obtain a plurality of input images associated with a plurality of different spatial views; generate a set of features based on the plurality of input images; generate a set of projected features based on the set of features, wherein an embedding size associated with the set of projected features is smaller than an embedding size associated with the set of features; and determine a cross-view attention associated with the plurality of different spatial views, the cross-view attention determined using the set of projected features.

Aspect 2. The apparatus of Aspect 1, wherein, to determine the cross-view attention, the at least one processor is configured to: process, using one or more linear transformers, the set of projected features to determine a cross-attention associated with each respective feature included in the set of projected features.

Aspect 3. The apparatus of any one of Aspects 1 to 2, wherein: the set of features includes a plurality of multi-scale feature maps associated with the plurality of input images; and each respective multi-scale feature map included in the plurality of multi-scale feature maps is associated with a different embedding size.

Aspect 4. The apparatus of Aspect 3, wherein the set of features includes a respective multi-scale feature map associated with each input image included in the plurality of input images.

Aspect 5. The apparatus of any one of Aspects 3 to 4, wherein, to generate the set of projected features, the at least one processor is configured to: project each respective multi-scale feature map into a fixed embedding size associated with the set of projected features.

Aspect 6. The apparatus of any one of Aspects 1 to 5, wherein the at least one processor is further configured to: generate one or more visual perception task outputs based on the cross-view attention.

Aspect 7. The apparatus of Aspect 6, wherein the one or more visual perception task outputs include one or more depth maps associated with the plurality of input images or one or more optical flow maps associated with the plurality of input images.

Aspect 8. The apparatus of any one of Aspects 6 to 7, wherein the one or more visual perception task outputs include one or more object detection outputs associated with the plurality of input images or one or more segmentation masks associated with the plurality of input images.

Aspect 9. The apparatus of any one of Aspects 1 to 8, wherein: the plurality of different spatial views is associated with a scene; and each respective input image included in the plurality of input images is associated with a different spatial view of the scene.

Aspect 10. The apparatus of Aspect 9, wherein each respective input image included in the plurality of input images is obtained using a respective camera included in a plurality of cameras.

Aspect 11. The apparatus of any one of Aspects 9 to 10, wherein: the plurality of input images is obtained using one or more cameras; and each respective input image included in the plurality of input images is associated with a different time or a different spatial view.

Aspect 12. The apparatus of any one of Aspects 1 to 11, wherein the at least one processor is further configured to: generate a first set of projected features based on a first set of input images included in the plurality of input images, the first set of input images associated with a first set of spatial views having at least a partial overlap; and generate a second set of projected features based on a second set of input images included in the plurality of input images, the second set of input images associated with a second set of spatial views having at least a partial overlap.

Aspect 13. The apparatus of Aspect 12, wherein the at least one processor is further configured to: determine a first cross-view attention associated with the first set of spatial views, the first cross-view attention determined using the first set of projected features; and determine a second cross-view attention associated with the second set of spatial views, the second cross-view attention determined using the second set of projected features.

Aspect 14. The apparatus of Aspect 13, wherein the at least one processor is further configured to: generate one or more visual perception task outputs associated with the plurality of input images based on the first cross-view attention and the second cross-view attention.

Aspect 15. The apparatus of any one of Aspects 12 to 14, wherein the first set of input images is different than the second set of input images.

Aspect 16. The apparatus of any one of Aspects 12 to 15, wherein: each respective input image included in the first set of input images overlaps with at least a portion of one or more remaining input images included in the first set of input images; and each respective input image included in the second set of input images overlaps with at least a portion of one or more remaining input images included in the second set of input images.

Aspect 17. The apparatus of Aspect 16, wherein: each respective input image included in the first set of input images is non-overlapping with each respective input image included in the second set of input images.

Aspect 18. A processor-implemented method of processing image data, the method comprising: obtaining a plurality of input images associated with a plurality of different spatial views; generating a set of features based on the plurality of input images; generating a set of projected features based on the set of features, wherein an embedding size associated with the set of projected features is smaller than an embedding size associated with the set of features; and determining a cross-view attention associated with the plurality of different spatial views, the cross-view attention determined using the set of projected features.

Aspect 19. The processor-implemented method of Aspect 18, wherein determining the cross-view attention comprises: processing, using one or more linear transformers, the set of projected features to determine a cross-attention associated with each respective feature included in the set of projected features.

Aspect 20. The processor-implemented method of any one of Aspects 18 to 19, wherein: the set of features includes a plurality of multi-scale feature maps associated with the plurality of input images; and each respective multi-scale feature map included in the plurality of multi-scale feature maps is associated with a different embedding size.

Aspect 21. The processor-implemented method of Aspect 20, wherein the set of features includes a respective multi-scale feature map associated with each input image included in the plurality of input images.

Aspect 22. The processor-implemented method of any one of Aspects 20 to 21, wherein generating the set of projected features comprises projecting each respective multi-scale feature map into a fixed embedding size associated with the set of projected features.

Aspect 23. The processor-implemented method of any one of Aspects 18 to 22, further comprising generating one or more visual perception task outputs based on the cross-view attention.

Aspect 24. The processor-implemented method of Aspect 23, wherein the one or more visual perception task outputs include one or more depth maps associated with the plurality of input images or one or more optical flow maps associated with the plurality of input images.

Aspect 25. The processor-implemented method of any one of Aspects 23 to 24, wherein the one or more visual perception task outputs include one or more object detection outputs associated with the plurality of input images or one or more segmentation masks associated with the plurality of input images.

Aspect 26. The processor-implemented method of any one of Aspects 18 to 25, wherein: the plurality of different spatial views are associated with a scene; and each respective input image included in the plurality of input images is associated with a different spatial view of the scene.

Aspect 27. The processor-implemented method of Aspect 26, wherein each respective input image included in the plurality of input images is obtained using a respective camera included in a plurality of cameras.

Aspect 28. The processor-implemented method of any one of Aspects 26 to 27, wherein: the plurality of input images is obtained using one or more cameras; and each respective input image included in the plurality of input images is associated with a different time or a different spatial view.

Aspect 29. The processor-implemented method of any one of Aspects 18 to 28, further comprising: generating a first set of projected features based on a first set of input images included in the plurality of input images, the first set of input images associated with a first set of spatial views having at least a partial overlap; and generating a second set of projected features based on a second set of input images included in the plurality of input images, the second set of input images associated with a second set of spatial views having at least a partial overlap.

Aspect 30. The processor-implemented method of Aspect 29, further comprising: determining a first cross-view attention associated with the first set of spatial views, the first cross-view attention determined using the first set of projected features; and determining a second cross-view attention associated with the second set of spatial views, the second cross-view attention determined using the second set of projected features.

Aspect 31. The processor-implemented method of Aspect 30, further comprising generating one or more visual perception task outputs associated with the plurality of input images based on the first cross-view attention and the second cross-view attention.

Aspect 32. The processor-implemented method of any one of Aspects 29 to 31, wherein the first set of input images is different than the second set of input images.

Aspect 33. The processor-implemented method of any one of Aspects 29 to 32, wherein: each respective input image included in the first set of input images overlaps with at least a portion of one or more remaining input images included in the first set of input images; and each respective input image included in the second set of input images overlaps with at least a portion of one or more remaining input images included in the second set of input images.

Aspect 34. The processor-implemented method of Aspect 33, wherein: each respective input image included in the first set of input images is non-overlapping with each respective input image included in the second set of input images.

Aspect 35. A non-transitory computer-readable storage medium comprising instructions stored thereon which, when executed by at least one processor, causes the at least one processor to perform operations according to any of Aspects 1 to 34.

Aspect 36. An apparatus for processing image data, comprising one or more means for performing operations according to any of Aspects 1 to 34.

What is claimed is:

1. An apparatus for processing image data, the apparatus comprising:

at least one memory; and at least one processor coupled to the at least one memory and configured to:

obtain a plurality of input images associated with a plurality of different spatial views, wherein the plurality of input images includes a first subset of input images associated with a first group of spatial views having at least a partial overlap and a second subset of input images associated with a second group of spatial views having at least a partial overlap;

generate a set of features based on the plurality of input images;

generate a set of projected features based on the set of features, wherein an embedding size associated with the set of projected features is smaller than an embedding size associated with the set of features, and wherein the set of projected features includes a first subset of projected features generated based on the first subset of input images and a second subset of projected features generated based on the second subset of input images; and determine, using the set of projected features, a cross-view attention associated with the plurality of different spatial views, wherein a first cross-view attention associated with the first group of spatial views is determined using the first subset of projected features, and wherein a second cross-view attention associated with the second group of spatial views is determined using the second subset of projected features.

2. The apparatus of claim 1, wherein, to determine the cross-view attention, the at least one processor is configured to:

process, using one or more linear transformers, the set of projected features to determine a cross-attention associated with each respective feature included in the set of projected features.

3. The apparatus of claim 1, wherein:

the set of features includes a plurality of multi-scale feature maps associated with the plurality of input images; and each respective multi-scale feature map included in the plurality of multi-scale feature maps is associated with a different embedding size.

4. The apparatus of claim 3, wherein the set of features includes a respective multi-scale feature map associated with each input image included in the plurality of input images.

5. The apparatus of claim 3, wherein, to generate the set of projected features, the at least one processor is configured to:

project each respective multi-scale feature map into a fixed embedding size associated with the set of projected features.

6. The apparatus of claim 1, wherein the at least one processor is further configured to:

generate one or more visual perception task outputs based on the cross-view attention.

7. The apparatus of claim 6, wherein the one or more visual perception task outputs include one or more depth maps associated with the plurality of input images or one or more optical flow maps associated with the plurality of input images.

8. The apparatus of claim 6, wherein the one or more visual perception task outputs include one or more object detection outputs associated with the plurality of input images or one or more segmentation masks associated with the plurality of input images.

9. The apparatus of claim 1, wherein:

the plurality of different spatial views is associated with a scene; and each respective input image included in the plurality of input images is associated with a different spatial view of the scene.

10. The apparatus of claim 9, wherein each respective input image included in the plurality of input images is obtained using a respective camera included in a plurality of cameras.

11. The apparatus of claim 9, wherein:

the plurality of input images is obtained using one or more cameras; and each respective input image included in the plurality of input images is associated with a different time or a different spatial view.

12. The apparatus of claim 1, wherein the at least one processor is further configured to:

generate one or more visual perception task outputs associated with the plurality of input images based on the first cross-view attention and the second cross-view attention.

13. The apparatus of claim 1, wherein the first subset of input images is different than the second subset of input images.

14. The apparatus of claim 1, wherein:

each respective input image included in the first subset of input images overlaps with at least a portion of one or more remaining input images included in the first subset of input images; and each respective input image included in the second subset of input images overlaps with at least a portion of one or more remaining input images included in the second subset of input images.

15. The apparatus of claim 14, wherein:

each respective input image included in the first subset of input images is non- overlapping with each respective input image included in the second subset of input images.

16. A processor-implemented method of processing image data, the method comprising:

obtaining a plurality of input images associated with a plurality of different spatial views, wherein the plurality of input images includes a first subset of input images associated with a first group of spatial views having at least a partial overlap and a second subset of input images associated with a second group of spatial views having at least a partial overlap;

generating a set of features based on the plurality of input images;

generating a set of projected features based on the set of features, wherein an embedding size associated with the set of projected features is smaller than an embedding size associated with the set of features, and wherein the set of projected features includes a first subset of projected features generated based on the first subset of input images and a second subset of projected features generated based on the second subset of input images; and determining, using the set of projected features, a cross-view attention associated with the plurality of different spatial views, wherein a first cross-view attention associated with the first group of spatial views is determined using the first subset of projected features, and wherein a second cross-view attention associated with the second group of spatial views is determined using the second subset of projected features.

17. The processor-implemented method of claim 16, wherein determining the cross-view attention comprises:

processing, using one or more linear transformers, the set of projected features to determine a cross-attention associated with each respective feature included in the set of projected features.

18. The processor-implemented method of claim 16, wherein:

the set of features includes a plurality of multi-scale feature maps associated with the plurality of input images; and each respective multi-scale feature map included in the plurality of multi-scale feature maps is associated with a different embedding size.

19. The processor-implemented method of claim 18, wherein generating the set of projected features comprises projecting each respective multi-scale feature map into a fixed embedding size associated with the set of projected features.

20. The processor-implemented method of claim 16, further comprising generating one or more visual perception task outputs based on the cross-view attention, wherein the one or more visual perception task outputs include one or more depth maps associated with the plurality of input images or one or more optical flow maps associated with the plurality of input images.

21. The processor-implemented method of claim 20, wherein the one or more visual perception task outputs include one or more object detection outputs associated with the plurality of input images or one or more segmentation masks associated with the plurality of input images.

22. The processor-implemented method of claim 16, wherein:

the plurality of different spatial views is associated with a scene; and each respective input image included in the plurality of input images is associated with a different spatial view of the scene.

23. The processor-implemented method of claim 22, wherein:

each respective input image included in the plurality of input images is obtained using a respective camera included in a plurality of cameras; and each respective input image included in the plurality of input images is associated with a different time or a different spatial view.

24. The processor-implemented method of claim 16, further comprising generating one or more visual perception task outputs associated with the plurality of input images based on the first cross-view attention and the second cross-view attention.

25. The processor-implemented method of claim 16, wherein:

the first subset of input images is different than the second subset of input images;

each respective input image included in the first subset of input images overlaps with at least a portion of one or more remaining input images included in the first subset of input images; and each respective input image included in the second subset of input images overlaps with at least a portion of one or more remaining input images included in the second subset of input images.

26. The processor-implemented method of claim 25, wherein:

each respective input image included in the first subset of input images is non- overlapping with each respective input image included in the second subset of input images.

* * * * *